US009161630B2

(12) United States Patent
Brncick et al.

(10) Patent No.: US 9,161,630 B2
(45) Date of Patent: Oct. 20, 2015

(54) DEFORMABLE SEAT SHELL WITH MOTION CONTROL

(71) Applicant: Faurecia Automotive Seating, LLC, Troy, MI (US)

(72) Inventors: Gregory Brncick, Holland, MI (US); Jared Alden Judson, Medford, MA (US); Timothy L. Moulton, Newport, RI (US); Sam Palmer, Arlington, MA (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 15 days.

(21) Appl. No.: 13/901,753

(22) Filed: May 24, 2013

(65) Prior Publication Data

US 2013/0313875 A1 Nov. 28, 2013

Related U.S. Application Data

(60) Provisional application No. 61/652,058, filed on May 25, 2012.

(51) Int. Cl.
*B60N 2/02* (2006.01)
*A47C 7/02* (2006.01)
*B60N 2/64* (2006.01)
*B60N 2/68* (2006.01)
*B60N 2/72* (2006.01)

(52) U.S. Cl.
CPC ............. *A47C 7/022* (2013.01); *B60N 2/646* (2013.01); *B60N 2/686* (2013.01); *B60N 2/72* (2013.01)

(58) Field of Classification Search
CPC ........ A47C 7/022; B60N 2/646; B60N 2/686; B60N 2/72
USPC ............. 297/284.1, 384.3, 312, 452.63
See application file for complete search history.

(56) References Cited

U.S. PATENT DOCUMENTS

| 4,858,992 | A | * | 8/1989 | LaSota ............... 297/284.2 |
| 5,718,476 | A | * | 2/1998 | De Pascal et al. ......... 297/284.4 |
| 6,595,586 | B2 | * | 7/2003 | Brightbill et al. ........... 297/312 |
| 6,869,142 | B2 | * | 3/2005 | Heidmann et al. ......... 297/300.1 |
| 7,731,295 | B2 | * | 6/2010 | Lin ......................... 297/452.56 |
| 7,926,879 | B2 | * | 4/2011 | Schmitz et al. .......... 297/452.19 |
| 2004/0189078 | A1 | * | 9/2004 | Andersson et al. ...... 297/452.49 |
| 2012/0119551 | A1 | | 5/2012 | Brncick et al. |
| 2013/0088061 | A1 | | 4/2013 | Andersson et al. |

* cited by examiner

*Primary Examiner* — Philip Gabler
(74) *Attorney, Agent, or Firm* — Reising Ethington P.C.

(57) ABSTRACT

A seat assembly includes a seat bottom with a deformable seat shell. The deformable seat shell is configured to change shape with a changing occupant load distribution. The seat shell is coupled with a support frame via a shell motion controller having one or more motion control links. Each motion control link is coupled with the seat shell at a fixed location relative to the seat shell and with the support frame at a fixed location relative to the support frame. The shell motion controller allows these fixed locations to move relative to each other and also constrains their relative movement. The combined seat shell deformation and controlled movement relative to the support frame can provide the seat occupant with a comfortable seating experience while preventing pelvis drift and potentially eliminating traditional foam seat cushions.

20 Claims, 11 Drawing Sheets

DEFORMABLE SEAT SHELL WITH MOTION CONTROL

CROSS-REFERENCE TO RELATED APPLICATION

This application claims the benefit of U.S. Provisional Ser. No. 61/652,058 filed on May 25, 2012, the entire contents of which are incorporated herein by reference.

TECHNICAL FIELD

The present disclosure relates to a seat assembly and, in particular, to a seat assembly having a variable shape.

BACKGROUND

Seat assemblies, such as vehicle seats, often include a generally horizontal seat bottom and a generally upright seat back. Each of the seat bottom and seat back usually includes an underlying structure, a decorative covering material, and a foam bun or cushion between the structure and covering material. The foam cushion is softer than the underlying structure and is intended to provide a comfortable seating surface for a seat occupant. Such cushions may be configured to compress when the seat occupant is seated. Foam density, thickness, composition, and porosity may affect the overall feel of the seat. Traditional foam materials, such as polyurethane foam, are thermoset materials and may pose end-of-life difficulty with respect to dismantling and material recycling.

U.S. Patent Application Publication No. 2013/0088061 describes a seat assembly with a collapsible cushion support assembly disposed on a seat bottom frame. The collapsible cushion support assembly is configured to support a seat occupant when not collapsed. The seat assembly is configured so that the cushion support assembly collapses to a location closer to the vehicle floor when the seat back is folded down over the seat bottom to reduce the overall height of the folded seat assembly.

SUMMARY

In accordance with one or more embodiments, a seat assembly includes a seat bottom having a deformable seat shell configured to change shape with a changing occupant load distribution, a seat back coupled to and extending from the seat bottom, and a motion control link coupling the deformable seat shell with a support frame via a frame joint and a shell joint so that the joints can undergo relative movement. The frame joint is at a fixed position relative to the support frame, and the shell joint is at a fixed position relative to the deformable seat shell. The motion control link constrains the relative movement.

In accordance with one or more embodiments, the motion control link is a spring that undergoes elastic deformation when the joints undergo relative movement.

In accordance with one or more embodiments, the seat assembly includes a cam surface, and the motion control link elastically bends along the cam surface when the joints undergo relative movement.

In accordance with one or more embodiments, the seat assembly includes a cam surface that is fixed with respect to the support frame or with respect to the deformable seat shell.

In accordance with one or more embodiments, the seat assembly includes a cam surface and a layer of sound-attenuating material located between the motion control link and the cam surface when the motion control link elastically bends along the cam surface.

In accordance with one or more embodiments, the seat assembly includes a first cam surface located on one side of the motion control link and a second cam surface located on an opposite side of the motion control link. The motion control link elastically bends along both cam surfaces when the joints undergo relative movement.

In accordance with one or more embodiments, at least one of the joints is a constrained joint.

In accordance with one or more embodiments, the motion control link is an elongate member extending along a front-to-rear direction with respect to the seat assembly.

In accordance with one or more embodiments, the motion control link is an elongate member extending along a side-to-side direction with respect to the seat assembly.

In accordance with one or more embodiments, the motion control link is a flat spring.

In accordance with one or more embodiments, the motion control link is a flat spring, and the direction of the width of the flat spring is inclined with respect to horizontal.

In accordance with one or more embodiments, a second motion control link couples the deformable seat shell with the support frame via a second frame joint and a second shell joint so that the second joints can undergo relative movement. The second frame joint is at a fixed position relative to the support frame, and the second shell joint is at a fixed position relative to the deformable seat shell. The second motion control link constrains the relative movement of the joints.

In accordance with one or more embodiments, the motion control link(s) include at least one bolster spring that bends along an upward facing cam surface and a downward facing cam surface when the deformable seat shell and the support frame undergo relative movement.

In accordance with one or more embodiments, the motion control link(s) include at least one cross-spring that bends along an inclined cam surface so that the deformable seat shell moves in downward and rearward directions relative to the support frame when an occupant sits on the seat assembly.

In accordance with one or more embodiments, the deformable seat shell includes left and right leg support sections separated by a centrally located slot that allows the left and right leg support sections to simultaneously deform by different amounts from each other.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The seat assembly described herein employs a deformable seat shell that is configured to change shape with a changing occupant load distribution. The deformable seat shell may be coupled with a support frame via one or more motion control links configured to allow constrained relative movement between the frame and shell components. The combination of the deformable seat shell and its constrained relative movement with respect to the support frame can provide the seat occupant with a comfortable seating experience in both the short-term and long-term, while preventing pelvis drift and potentially eliminating traditional foam seat cushions. The resulting seat assembly is self-adjustable, conforming to the shape and size of the seat occupant, not only when first seated, but also when the seat occupant's weight, position, and/or posture changes while seated. Thus, the movement of the seat occupant can be the primary input that adjusts the seat assembly for comfort so that the seat occupant does not have to search for the most comfortable seating configuration through trial and error with multiple seat adjustments mechanism. While described below in the context of illustrative embodiments of vehicle seats, the teachings presented herein are applicable to any seat assembly, including office chairs, theatre seating, home furnishings, or any other type of seating.

Figure 1:
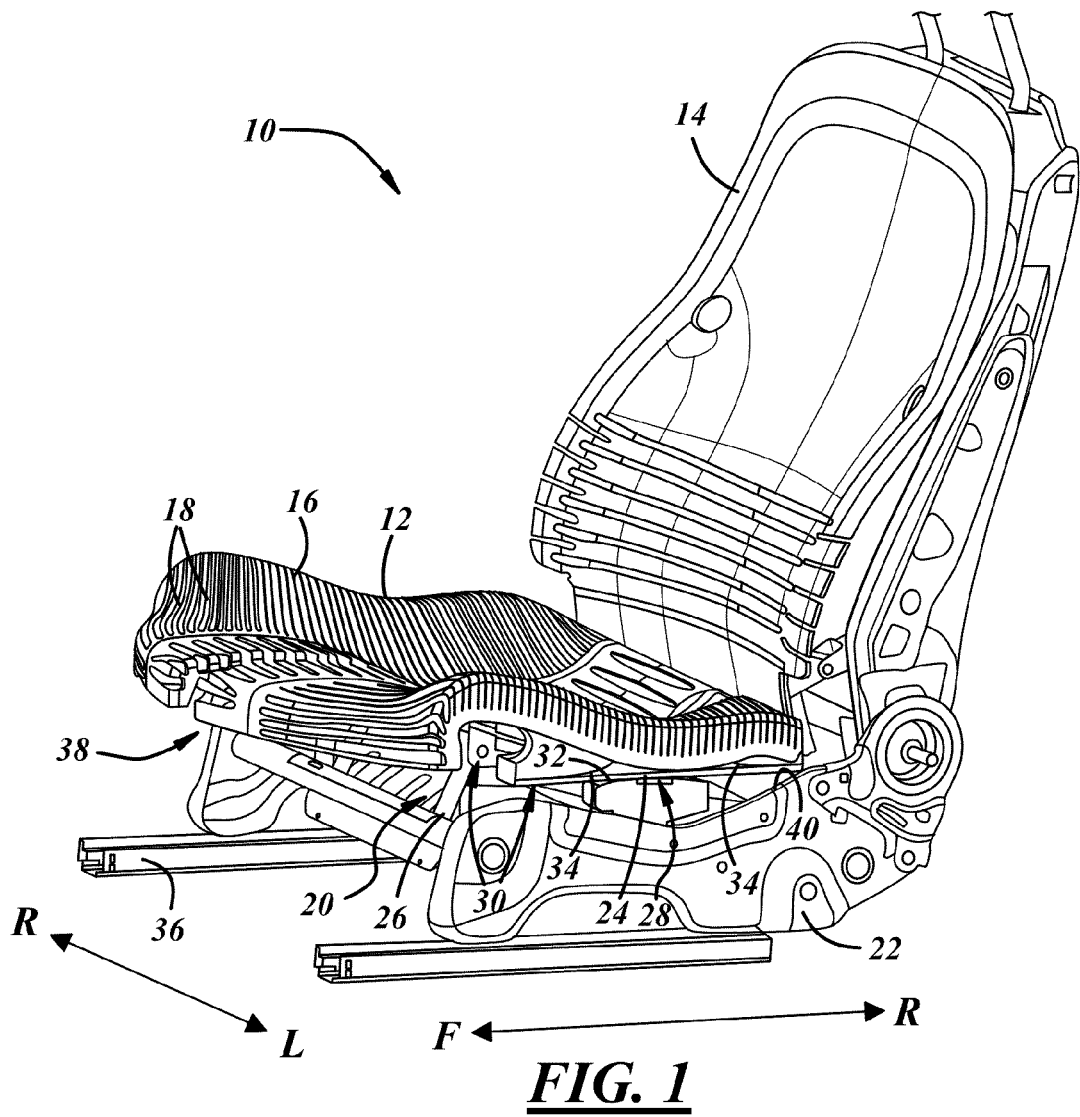
FIG. 1 is a perspective view of an embodiment of a seat assembly in the form of a vehicle seat including a deformable seat shell and a shell motion controller, shown without a decorative covering.

FIG. 1 illustrates one embodiment of the seat assembly 10 in the form of a vehicle seat, shown without a decorative covering or trim. The double-headed arrows in FIG. 1 indicate frontward and rearward directions (F and R), as well as left and right directions (L and R). The seat 10 includes a seat bottom 12 and a seat back 14 coupled to and extending from the seat bottom, in an upward direction in this embodiment. The illustrated seat back 14 includes a backrest portion extending from the seat bottom and a headrest portion extending from an opposite end of the backrest. The seat bottom 12 includes a deformable seat shell 16 configured to change shape with a changing occupant load distribution. A changing occupant load distribution occurs when a person first sits on or vacates the seat assembly, when a seat occupant shifts his or her weight, position and/or posture, or when inertial forces cause the weight of the seat occupant to be distributed differently, such as during vehicle speed-changing or turning maneuvers or during a collision, where the seat assembly is a vehicle seat. The deformable shell 16 may be monolithic (formed from a single piece of material) or an assembly of components. In one embodiment, the deformable shell 16 is formed from a plastic material with a plurality of slots 18 formed through the thickness of the material, as shown in the example of FIG. 1. The slots 18 provide an otherwise semi-rigid plastic shape with shape-changing flexibility so that the deformable shell 16 can bend, flex, twist or otherwise change shape in response to changes in the load and/or load distribution applied thereto.

The exemplary deformable seat shells shown as line drawings in the accompanying figures are merely impressional representations or suggestions of overall appearance. For example, the illustrated deformable seat shells include large numbers of slots with complex three-dimensional shapes that are difficult to represent as line drawings in two-dimensions. Thus, many of the seat shell slots in the line drawings are represented without slot ends and/or are represented as lines only to indicate contour and/or location. Reference is made to FIGS. 22-28 for examples of deformable seat shells that have been constructed for shape-changing and constrained movement by one or more motion control links as described herein. The example of FIG. 22 includes a plurality of slots formed therethrough. Some of the slots are located along the top of the shell and extend laterally (left-and-right) from a central portion of the shell and partially down sidewalls of the shell. Other larger slots, fewer in number, are located along the top of the shell in the central portion of the shell where a seat occupant would sit. The example of FIG. 23 includes a similar arrangement of slots in the central portion with the left and right portions having slots with a slight S-shape as they extend from the central portion to the sidewalls. FIGS. 22-28 are examples of various other deformable seat shells that can be supported with constrained movement by one or more motion control links as described below. Any other configuration capable of shape-changing movement in response to changes in the load and/or load distribution applied to the seat shell is possible.

Referring again to FIG. 1, a shell motion controller 20 couples the deformable seat shell 16 with a support frame 22 so that the deformable shell and the support frame can undergo constrained relative movement. The shell motion controller 20 includes one or more motion control links 24, 26. In this particular example, the shell motion controller 20 includes a plurality of motion control links, including outer motion control links 24 and inner motion control links 26. Each of the motion control links 24, 26 couples the deformable seat shell 16 with the support frame 22 via a frame joint 28 and a shell joint 30. Each frame joint 28 has a fixed position relative to the support frame 22, and each shell joint 30 has a fixed position relative to the deformable seat shell 16. Each motion control link 24, 26 has a corresponding frame joint 28 and shell joint 30 and allows the pair of joints to move with respect to each other while also constraining their relative movement.

In the illustrated embodiment, each motion control link 24, 26 is a spring that undergoes elastic deformation when the corresponding frame and shell joints 28, 30 undergo relative movement. Each of the illustrated outer motion control links 24 is an elongate member extending along the front-to-rear direction with respect to the seat assembly. More particularly, each of the illustrated outer motion control links 24 is a strip of material (i.e., a flat spring) that bends in a direction parallel with the direction of the thickness of the strip of material (i.e., up and/or down) when the corresponding joints 28, 30 undergo relative movement. Frame and shell joints 28, 30 are located at opposite ends of each outer motion control link and are constrained joints in this example. As used herein, a constrained joint is a joint with zero degrees of freedom. This use of "constrained" is not to be confused with the constrained relative movement of the frame and shell joints 28, 30. In the context of relative movement, "constrained" indicates that the distance between the joints 28, 30 is limited by some other component or attribute (such as the length of the corresponding motion control link). Other types of joints include a pivot joint (one rotational degree of freedom), a sliding joint (one linear degree of freedom, and a ball joint (two rotational degrees of freedom), for example. Constrained joints can be formed using a fastener, weld, adhesive or other means and may also include flanges, ribs, brackets, or other features intended to limit the relative movement between joined components.

The outer motion control links 24 shown in FIG. 1 may also be referred to as bolster springs, as they are located along the left and right sides of the seat assembly to support the side bolster regions of the seat bottom 12. Each of the bolster springs 24 is configured to elastically bend along at least one cam surface 32, 34 when the corresponding joints 28, 30 undergo relative movement. In particular, each of the illustrated bolster springs 24 bends along an upward facing cam surface 32 and a downward facing cam surface 34. In this example, the upward facing cam surface 32 is fixed in position relative to the support frame 20, and the downward facing cam surface 34 is fixed in position relative to the deformable seat shell 16. This motion is subsequently described in greater detail.

Each of the illustrated inner motion control links 26 is also a strip of material that bends in a direction parallel with the direction of its thickness. When in an unloaded or relaxed position as shown, the illustrated inner control links 26 are inclined with respect to the horizontal, extending in both the front-to-rear direction and the up-and-down direction. The corresponding frame and shell joints 28, 30 are located at opposite ends of each inner motion control link 26. In this case, the shell joint 30 is a pivot joint, and the frame joint (not shown in FIG. 1) is a constrained joint. The inner motion control links 26 shown in FIG. 1 may also be referred to as seating region springs, as they are located to support the seating region located between the side bolster regions of the seat bottom 12. Each of the seating region springs 26 is configured to elastically bend along at least one cam surface (not shown in FIG. 1) when the corresponding frame and shell joints undergo relative movement. Here, each of the springs 26 bends along an upward facing cam surface that is fixed in position relative to the support frame 20 so that the shell joint 30 moves in both downward and rearward directions relative to the corresponding frame joint.

Figure 2:
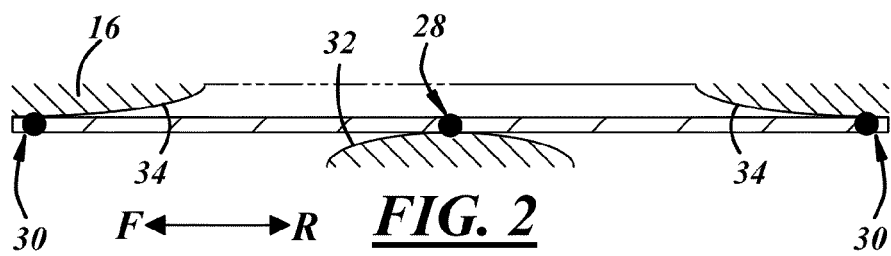
FIG. 2 is a schematic side view of outer motion control links in an unloaded condition.
Figure 3:
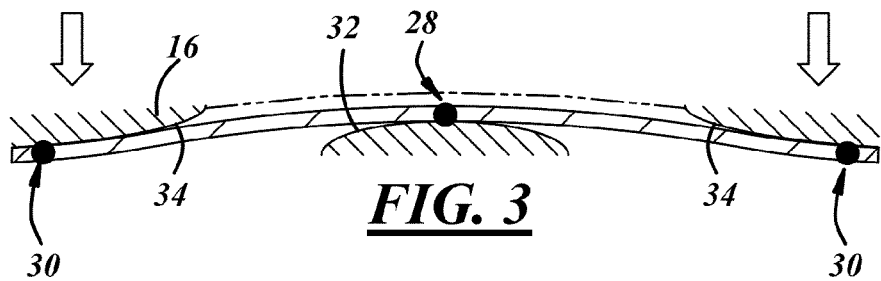
FIG. 3 is a schematic side view of the outer motion control links of FIG. 2 in a loaded condition.

FIGS. 2-5 are simplified schematic side views illustrating the constrained relative motion associated with each of the motion control links 24, 26 depicted in FIG. 1. FIG. 2 shows a pair of outer motion control links 24, each with a constrained frame joint 28 at one end and a constrained shell joint 30 at the opposite end. In this case, the pair of outer motion control links 24 is formed from a single piece of material so that the control links share a frame joint 28, with each control link extending from the frame joint 28 to individual shell joints 30. The illustrated pair of motion control links 24 could also be formed as separate components, and each may be configured with a unique spring rate, shape, joints, etc. FIG. 2 shows the control links 24 in a relaxed or unloaded condition in which they are generally flat. FIG. 3 shows the control links 24 after corresponding frame and shell joints 28, 30 undergo relative movement, such as when a seat occupant sits on the seat. Each motion control link 24 bends along upward facing and downward facing cam surfaces 32, 34, as shown. One effect of the cam surfaces 32, 34 is to continually increase the stiffness of the control links 24 as the deformable shell 16 and, thereby, the shell joints 30 move in a downward direction and the frame joints 28 remain stationary. That is, the effective length of each of the bolster springs 24 is continually decreased as each spring bends along and comes into contact with a larger portion of the cam surfaces 32, 34. The shape of the cam surfaces 32, 34 can thus be tuned to exhibit the desired rate of increase in spring rate for each spring. It is also noteworthy, particularly where both of the joints 28, 30 are constrained joints, that the ability of the deformable seat shell 16 to flex and change shape accommodates the movement illustrated in FIGS. 2 and 3. In other words, a rigid seat pan without the flexibility of the deformable seat shell 16 would not allow the frame joint 28 and shell joint 30 associated with one of the motion control links 24 to move closer together in the loaded condition shown in FIG. 3 than they are in the unloaded condition of FIG. 2. The phantom line shown between the two downward facing cam surfaces 34 schematically illustrates how a portion of the shape of the deformable shell may change when joints 28, 30 undergo relative movement.

Figure 4:
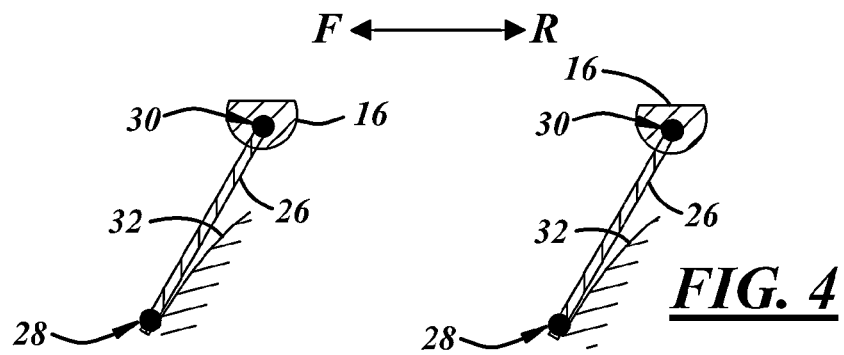
FIG. 4 is a schematic side view of inner motion control links in an unloaded condition.
Figure 5:
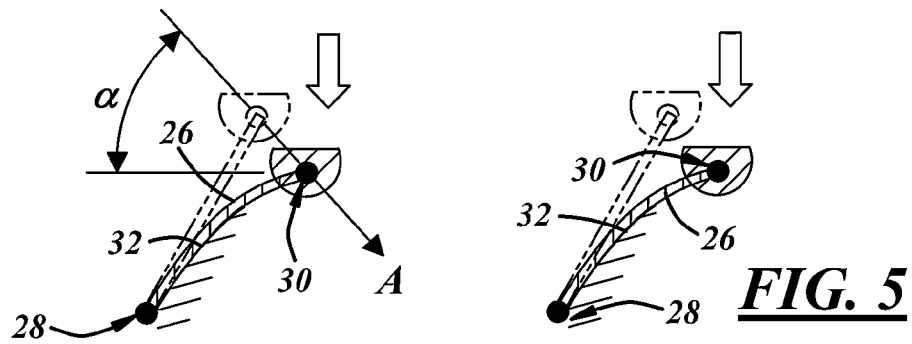
FIG. 5 is a schematic side view of the inner motion control links of FIG. 4 in a loaded condition.

FIG. 4 shows a pair of the inner motion control links 26 of FIG. 1, each with a constrained frame joint 28 at one end and a pivot shell joint 30 at the opposite end. In this case, the pair of motion control links 26 include front and rear inner motion control links, and each may be configured with a unique spring rate, shape, joints, etc. FIG. 4 shows the control links 26 in the relaxed or unloaded condition so that they are generally flat and inclined with respect to horizontal. FIG. 5 shows the control links 26 after corresponding frame and shell joints 28, 30 undergo relative movement, such as when a seat occupant sits on the seat. Each control link 26 bends along a corresponding upward facing cam surface 32, as shown. The effect of the cam surfaces 32 is to continually increase the stiffness of the seating region springs 26 as the deformable shell and, thereby, the shell joints 30 move in a downward and rearward direction and the frame joints 28 remain stationary. That is, the effective length of each of the control links 26 is continually decreased as each bends along and comes into contact with a larger portion of the corresponding cam surface 32. The shape of the cam surfaces 32 can thus be tuned to exhibit the desired rate of increase in spring rate for each spring. The cam surfaces 32 can also be configured to achieve the desired direction of movement of the deformable seat shell with respect to the support frame. In FIGS. 1-5, each of the upward facing cam surfaces 32 is fixed in position relative to the support frame 22, and each of the downward facing cam surfaces 34 is fixed in position relative to the deformable seat shell 16, but this need not always be the case. Any of the cam surfaces 32, 34 may be fixed in position or may be configured to move with either of the support frame 22 or the deformable seat shell 16 or with some other component, or they may be omitted entirely.

In FIG. 5, the unloaded position of the shell joints 30 is depicted in phantom. From the unloaded to the loaded positions, the shell joint 30 moves in direction A, though not necessarily along a straight path. The angle a represents the angle of a line formed between the loaded and unloaded positions of the shell joint 30. The angle a may range anywhere from 0-90 degrees, but is preferably between 15 and 75 degrees. In one embodiment, the angle α is between 30 and 60 degrees. In another embodiment, the angle α is about 45 degrees. Thus, when a seat occupant first sits on the seat, the deformable seat shell may move in downward and/or rearward directions, with the reverse movement occurring when the occupant vacates the seat. This type of movement can provide the occupant with a sensation that the seat assembly is "pulling" the occupant down into the seat and against the seat back for a more secure and comfortable feeling.

It is noteworthy that the movement of the outer motion control links 24 and the movement of the inner motion control links 26, though shown as independent movements in FIGS. 2-5, are not entirely independent. This is due to all of the frame joints 28 being fixed in position relative to the support frame, and all of the shell joints 30 being fixed in position relative to the deformable seat shell. The flexibility of the deformable seat shell accommodates relative movement of the different shell joints with respect to one another, and the otherwise predictable, uniform vertical movement provided by the depicted bolster springs 24 if they were acting alone, may be affected by the constraints on seat shell movement due to the seating region springs 26.

Referring again to FIG. 1, some of the above-described components are further described as portions of other sub-components of the illustrated seat assembly 10. The seat assembly 10 includes a seat foundation 36 adapted to be anchored to a vehicle floor. The seat bottom 12 is mounted on the seat foundation 36. The seat bottom 12 includes a variable-shape seat pan 38 that is arranged to underlie and support a person that is seated on seat bottom 12. The variable-shape seat pan 38 includes the above-described deformable seat shell 16 and is configured to change shape in response to a shift in position or a change in posture of the seated person from an initial seat-pan shape to a subsequent seat-pan shape. In this example, the seat bottom 12 includes the support frame 22 (also referred to as a pan support frame in this case), the decorative seat covering (not shown), and a frame shield (not shown). The seat cover may be coupled to the variable-shape seat pan 38, and the frame shield may be coupled to the support frame 22 to hide portions thereof. The support frame 22 is configured to be mounted on the underlying seat foundation 36 to provide means for supporting the variable-shape seat pan 38 above the vehicle floor at all times and during a change in shape to the variable-shape seat pan. It is within the scope of this disclosure to use any suitable support frame 22 on the seat foundation 36 to support the variable-shape seat pan 38 for shape-changing movement relative to the vehicle floor. It is also within the scope of this disclosure to mount the variable-shape seat pan 38 on the vehicle floor. In one embodiment, the vehicle floor is the support frame 22. The support frame 22 may include one or more foundation support surfaces 40. In the example of FIG. 1, the support frame 22 includes left and right support surfaces 40 that face upwardly toward the variable-shape seat pan 38 and away from the vehicle floor to mate with downwardly facing portions of the variable-shape seat pan 38 to support the seat pan on the support frame.

Figure 6:
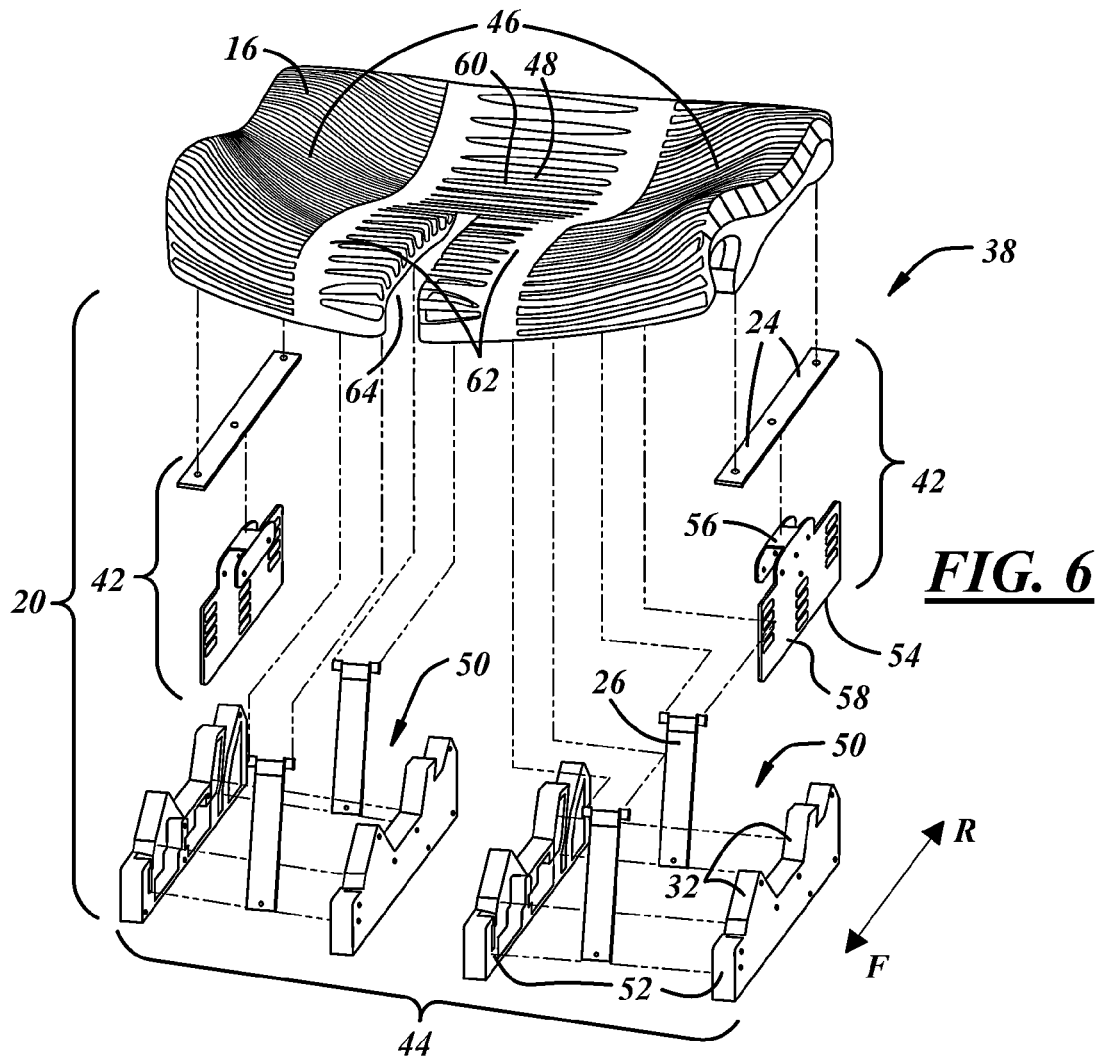
FIG. 6 is an exploded view of a portion of the seat assembly of FIG. 1.

With reference to FIG. 6, some more of the above-described components are further described as portions of other sub-components of the seat assembly 10 of FIG. 1. FIG. 6 is an exploded view of the variable-shape seat pan 38 of FIG. 1. As shown, the seat pan 38 includes the deformable seat shell 16 and the shell motion controller 20, also referred to as a compliant shell motion controller in some cases. The shell motion controller 20 is coupled to the deformable seat shell 16 and is configured to mate with the foundation support surfaces of the support frame. As described above, the deformable seat shell 16 may be formed from a deformable material and is able to change shape from a first seat shell shape to assume a plurality of seat shell shapes, including an illustrative second seat shell shape. In some embodiments, the deformable seat shell 16 is made from an elastic and/or plastic material. In some embodiments, the shell-motion controller 20 is made from the same material as the deformable seat shell 16 and cooperates with the deformable seat shell to form the variable-shape seat pan 38. In some embodiments, the variable-shape seat pan 38 is monolithic. It is within the scope of this disclosure to overmold the deformable seat shell 16 onto separate first and second spring units similar in function to the shell mounts described herein.

The illustrated shell motion controller 20 includes first and second outer shell mounts 42 and an inner shell mount 44. The inner shell mount 44 is positioned between the first and second outer shell mounts 42. Each shell mount 42, 44 is coupled to the deformable seat shell 16 and adapted to mate with the support frame or some other component that is stationary with respect to the vehicle floor. In this embodiment, each outer shell mount 42 is coupled to opposite side portions 46 of the deformable seat shell 16 and arranged to lie in spaced-apart relation (e.g., left-to-right) to with each other. The inner shell mount 44 is coupled to a central or occupant-support portion 48 of the deformable seat shell 16 between the first and second outer shell mounts 42. Each inner shell mount 44 in this example is configured to mate with the support frame 22 to support the deformable seat shell 16 for shape-changing movement relative to the vehicle floor or other seat assembly support surface. The illustrated inner shell mount 44 controls movement of the deformable seat shell 16 when an occupant sits on the deformable seat shell 16 so that the seat shell moves down and to the rear toward the seat back. In one example, the deformable seat shell 16 moves about 50% down and 50% to the rear. In other words, about half of the movement is downward movement and about half of the movement is rearward movement (e.g. along a 45-degree angle).

The illustrated inner shell mount 44 includes left and right link foundations 50 and four inner motion control links 26. The left and right inner link foundations 50 are substantially similar in this example. The left and right link foundations 50 are coupled to and arranged to lie in a stationary or fixed position on the support frame. One end of each of two of the motion control links 26 is coupled to each link foundation 50 in spaced-apart relation (e.g. front-to-rear) to form the constrained frame joints, and an opposite end of each of the two motion control links is coupled to the central portion 48 of the deformable seat shell 16 at an opposite end to form the pivot shell joints. As shown in FIG. 6, each exemplary inner link foundation 50 includes first and second foundation plates 52. Each pair of plates, 52 is coupled together to trap the motion control links 26 therebetween. Each of the illustrated inner link foundations 50 is formed to include the upward facing cam surfaces 32 described above—one for each associated motion control link 26. When the deformable seat shell 16 is in the unloaded condition, control links 26 extend between the deformable seat shell 16 and the associated link foundation at about a 45 degree angle with respect to horizontal. When the deformable seat shell 16 is in a loaded condition, the motion control links 26 bend toward the seat back to engage and conform to the corresponding cam surfaces 32, as shown for example in FIG. 5.

Each of the inner link foundations 50 may be constructed from a plastic material or from any suitable alternative. In one embodiment, the motion control links 26 are constructed from a metal material, such as spring steel, but may be made from any other suitable material such as an elastic, deformable plastic material or composite. Each motion control link 26 may be allowed to flex and/or to change in orientation (e.g. slope), shape, and/or length to support a change in shape of the deformable seat shell 16 during exposure of the variable-shape seat pan 38 to external forces applied to the deformable shell by the seat occupant as he or she person shifts position or changes posture on the seat bottom 12 or is acted upon by inertial forces.

The inner motion control links 26 are included with the illustrated inner shell mount 44 and cooperate to provide means for yieldably supporting the deformable seat shell 16 for controlled movement relative to the left and right inner link foundations 50, which in this case are fixed relative to the support frame and vehicle floor, in response to forces applied by the seat occupant to the deformable seat shell. In the illustrated embodiment, the initial orientations of the control links 26 support the deformable seat shell 16 in a first or undeformed (unloaded) seat shell shape with relatively steep positive slopes with respect to horizontal. In contrast, the final or loaded orientations of the motion control links 26 change after the deformable seat shell 16 has been moved to assume a second or deformed (loaded) seat shell shape. When loaded, the control links 26 have a relatively lower positive slope than when unloaded and generally conform to the cam surfaces 32.

Each outer shell mount 42 of FIG. 6 is configured to mate with a foundation support surface of the support frame to support the deformable seat shell 16 for shape-changing movement relative to the vehicle floor, ground, or other seat assembly support surface. The outer shell mounts 42 control movement of opposite first and second side portions 46 of the deformable seat shell 16 when an occupant sits on the deformable shell 16 so that the opposite side portions 46 of the seat shell move generally vertically. Each outer shell mount 42 in this example includes a link foundation 54 and two outer motion control links 24. Each link foundation 54 is coupled to and arranged to lie in a stationary or fixed position relative to the support frame. Each of the motion control links 24 is coupled at one end to a corresponding link foundation 54 and at an opposite end to a side portion 46 of the deformable seat shell 16. Each outer shell mount 42 may be made of metal or any other suitable material such as an elastic, deformable plastic material. The motion control links 24 may also be made of metal or any other suitable material, such as an elastic, deformable plastic material. Each motion control link 24 may be configured to flex and/or change orientation (e.g. slope), shape, and/or length to support a change in shape of the deformable seat shell 16 during exposure of the variable-shape seat pan 38 to external forces applied to the seat shell 16.

In the illustrated example, each link foundation 54 includes a link anchor strip 56 and an anchor mount 58 coupled to the anchor strip and arranged to extend downwardly toward the support frame. The link anchor strip mates with the underlying foundation support surface of the support frame 22. The anchor mount 58 is adapted to be coupled to a nearby portion of the support frame 22 to hold the anchor strip 56 in mating engagement with the foundation support surface.

The outer motion control links 24 included with each outer shell mount 42 cooperate to provide means for yieldably supporting the deformable shell 16 for controlled movement relative to the link foundation 54. The initial orientations of the control links 24 support the deformable seat shell 16 in a first seat-shell shape. For example, relative to the underlying link anchor strip 56, each control link 24 has a relatively flat, horizontal slope. The orientations of the motion control links 24 change after the deformable seat shell 16 has been moved to assume a second seat-shell shape. For example, relative to each of the underlying link anchor strips 56, some of the motion control links 24 (i.e., the forward-most ones) assume one slope, and some of the motion control links (i.e., the rear-most ones) assume an opposite slope. As a result, and as depicted by way of example in FIGS. 2 and 3, the side portions 46 of the deformable seat shell 16 are constrained to move generally vertically relative to the associated link foundation 54, which is fixed in location relative to the support frame 22 and the vehicle floor.

As noted above, the deformable seat shell 16 includes central portion 48 arranged between and interconnecting opposite first and second side portions 46. In the illustrated embodiment, the central portion 48 includes a buttocks-support section 60, and left and right leg support sections 62. The central portion 48 may include a slot or cleave 64, as shown, located between forward portions of the leg sections 62 to free those sections for limited relative movement under loads applied by a seat occupant. The slot 64 is centrally located and enables the leg support sections 62 to simultaneously deform or flex by different amounts from each other during shape-changing movement of the seat shell 16. The buttocks-support section 60 may be somewhat bowl-shaped, as shown, and may be formed to include several generally laterally extending slots 18 to enhance the deformability and shape-changing characteristics of the central portion 48.

Figure 7:
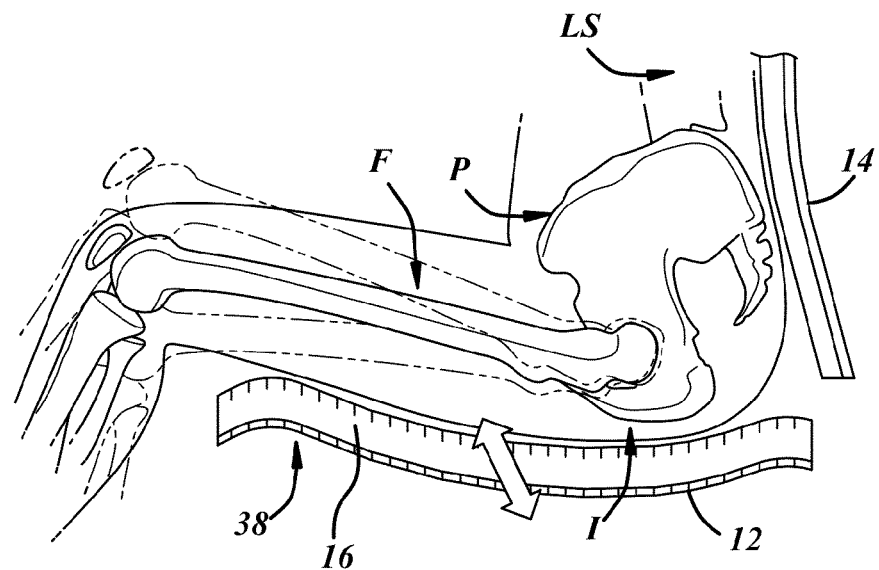
FIG. 7 is a schematic side view of an embodiment of the seat assembly with a seat occupant sitting thereon.
Figure 8:
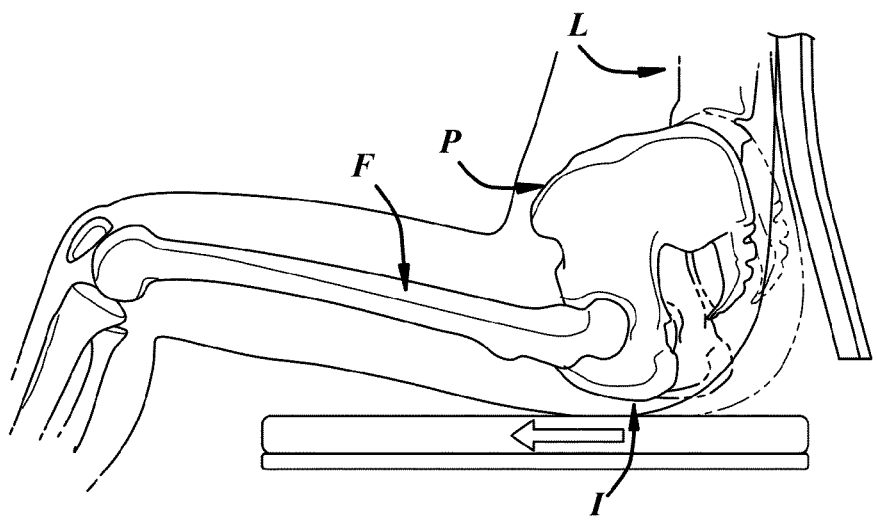
FIG. 8 is a schematic side view of a seat assembly illustrating pelvis drift.

An embodiment of the seat assembly is illustrated in FIG. 7 in an example of use. A seat occupant is shown seated on the seat bottom 12, which includes the variable-shape seat pan 38 with the deformable seat shell 16. The seat pan 38 is configured to provide means for maintaining the pelvis (P) of the seat occupant in engagement with the seat back 14 to lessen, minimize, or eliminate pelvis drift and thereby increase, maximize or provide occupant comfort. As shown in FIG. 7, the lower body of the seat occupant includes a lumbar spine region (LS), pelvis (P), ischia (I), and femur (F). Pelvis drift occurs when the pelvis slides away from the seat back 14 over time during use, such as during vehicle operation or office task performance, so that the pelvis is spaced away from the seat back. An example of pelvis drift is shown in FIG. 8, where the occupant is seated on a traditional seat pan. Pelvis drift is reduced and/or minimized as a result of the shell motion controller and associated motion control links controlling movement of the deformable seat shell 16 so that it moves downwardly and rearwardly toward the seat back 14, as shown in FIG. 7.

Figure 9:
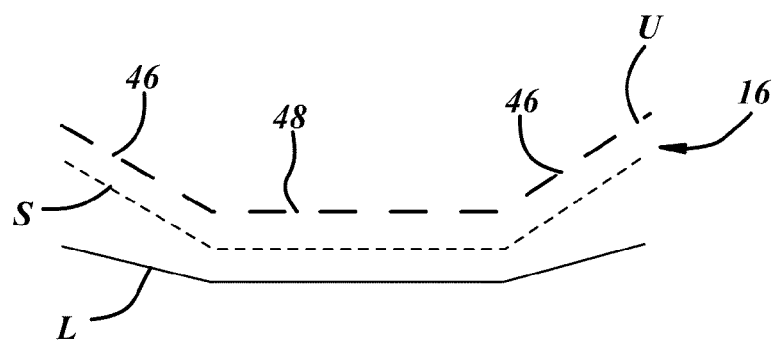
FIG. 9 is a schematic front view showing various shapes of a single deformable seat shell under various loading conditions due to various occupant sizes.

The above-described variable-shape seat pan 38 may also be configured to change in width in response to various sized occupants sitting on the seat assembly. FIG. 9 schematically shows front views of various shapes the deformable seat shell 16 may assume with different sized occupants. An unloaded or unoccupied condition of the deformable seat shell 16 is indicated in FIG. 9 as a dashed line (U). A first loaded condition is indicated in FIG. 9 as a dotted line (S), where a small seat occupant is seated on the deformable shell 16. The small occupant has a small width and is primarily supported by the central portion 48 of the deformable shell 16. As a result, relatively little force is transferred to the side portions 46 of the deformable shell so that they have relatively little downward movement. A second loaded condition is indicated in FIG. 9 as a solid line (L), where a large seat occupant is seated on the deformable shell 16. The large occupant has a large width and is supported by both the central portion 48 and the side portions 46 of the deformable shell 16. As a result, force is transferred to the side and central portions 46, 48 of the seat shell 16. Force transferred to the side portions 46 cause them to move down to create a relatively larger width for supporting the large occupant. Thus, a passive seat-width adjustment is provided. The shell motion controller and associated motion control links can be configured to provide a variable-width seating surface that is capable of supporting the 95th percentile male and the 5th percentile female and all sizes of occupants therebetween.

The variable-shape seat pan 38 can also be configured to provide a passive tilt function, where the rear-most portion of the deformable seat shell 16 moves down more than the front-most portion when changing shape from the unloaded to loaded condition. Such shape-changing movement can cause the knees of the seat occupant to be raised upwardly away from the vehicle floor as the bottom of the occupant is lowered downwardly toward the floor and rearward toward the seat back. When the deformable seat shell 16 has been moved to assume the second (loaded) seat shell shape, the motion control links have also moved to assume new shapes or slopes. Thus, the variable-shape seat pan 38 may be configured and arranged to replace a traditional tilt function of the seat assembly to minimize seat weight and cost. This passive tilt function is such that the amount of tilt can change with changing load distribution from the seat occupant, such as during occupant-initiated posture or position changes, inertial forces, or when a smaller or larger occupant is sitting on the seat.

Figure 10:
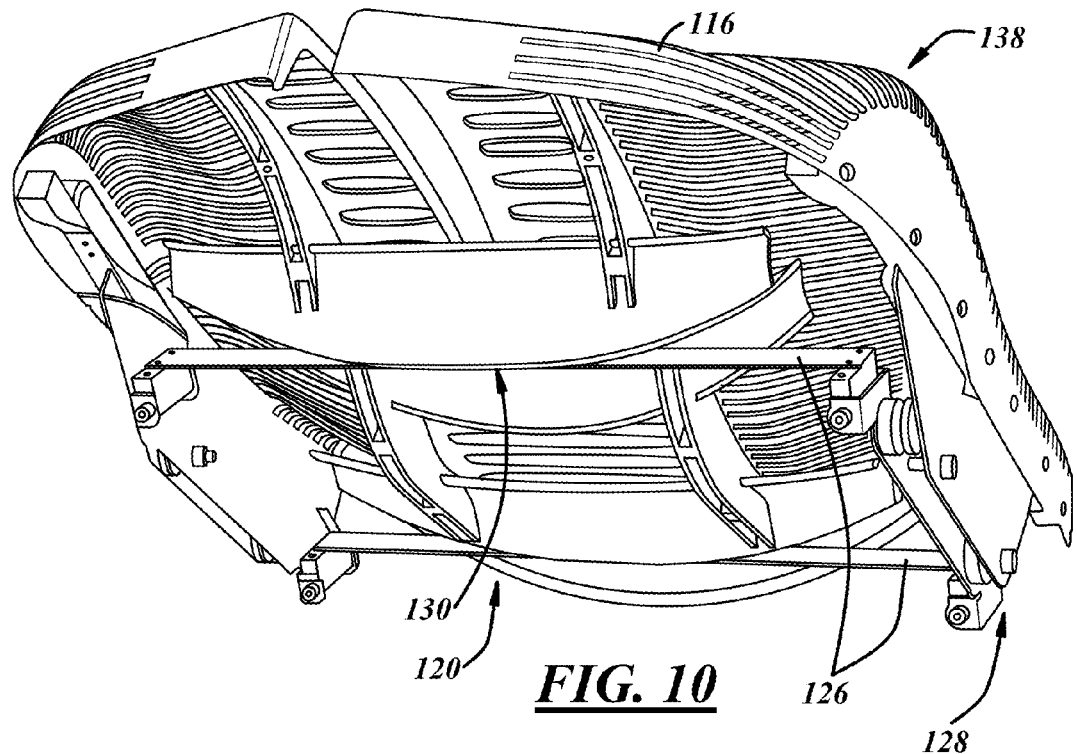
FIG. 10 is a front bottom perspective view of a portion of another embodiment of the seat assembly including a deformable seat shell and a shell motion controller.
Figure 11:
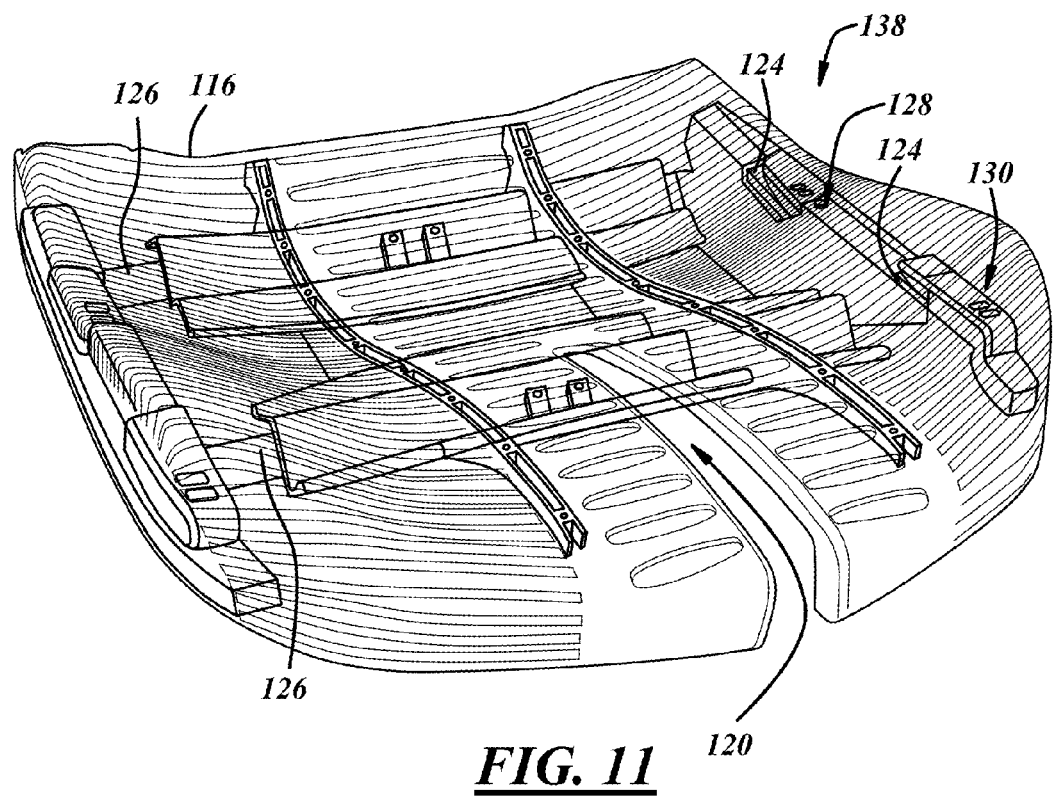
FIG. 11 is a front top perspective view of the portion of the seat assembly of FIG. 10.
Figure 12:
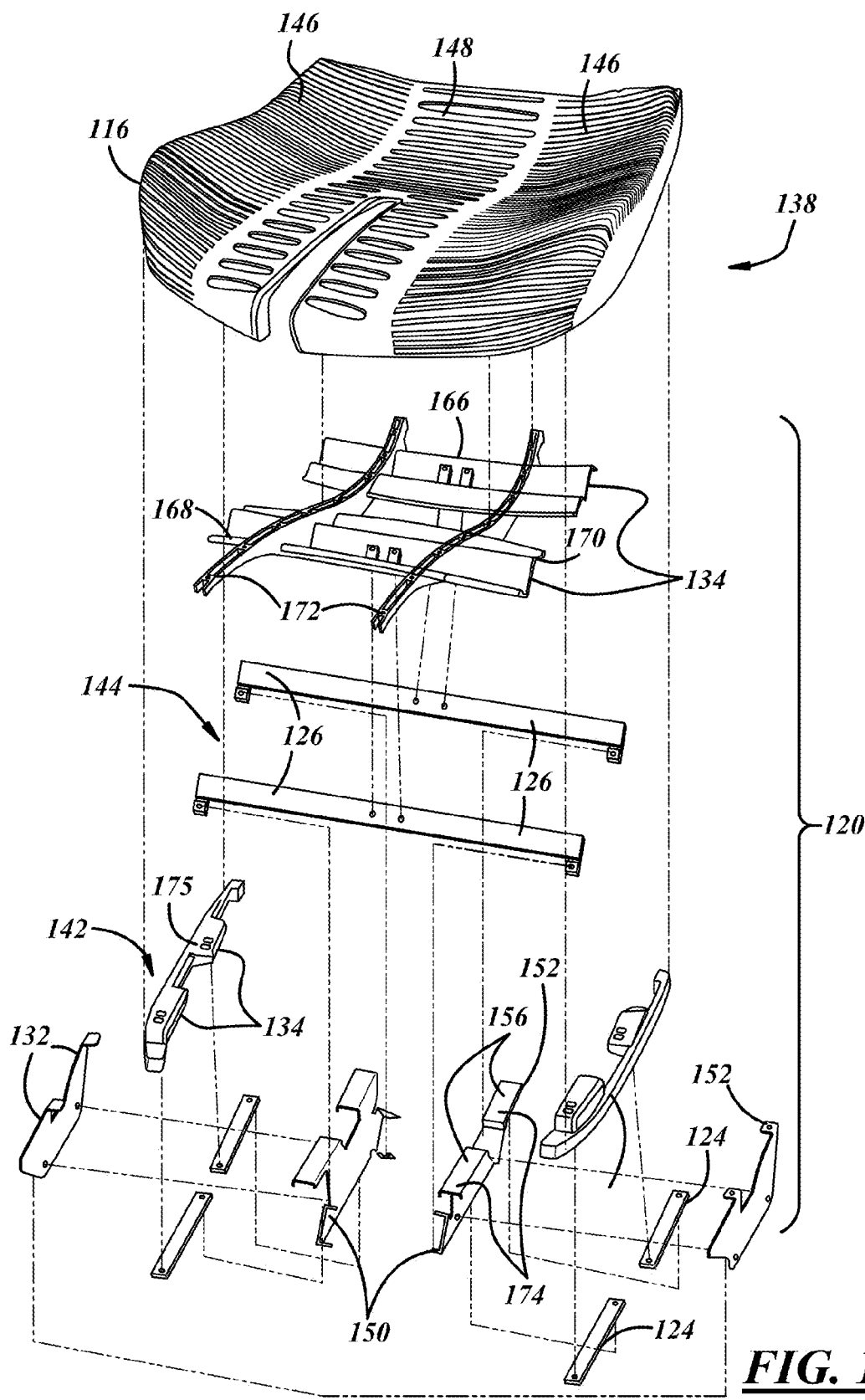
FIG. 12 is an exploded view of the portion of the seat assembly of FIG. 10.

FIGS. 10-12 illustrate a portion of another embodiment of the above-described seat assembly. The illustrated portion is the variable-shape seat pan 138, shown in a front-bottom view in FIG. 10, in a front-top view in FIG. 11 (with the outline of the deformable seat shell 116 in phantom), and in an exploded view in FIG. 12. The shell motion controller 120 includes differently configured outer motion control links 124 and inner motion control links 126. In particular, each of the inner control links 126 in this example is an elongate member extending along a side-to-side direction with respect to the seat assembly between a pivot frame joint 128 and a constrained shell joint 130. Each of the outer control links 124 extend along the front-to-back direction with respect to the seat assembly. This embodiment includes four inner motion control links comprising two pair of control links (front and rear pairs), with each pair being formed from a single strip of material that extends between opposite left and right pivot frame joints 128, located on opposite left and right sides of the seat. Each pair of inner motion control links shares a constrained shell joint 130, located centrally with respect to the seat. In this example, each of the four outer motion control links 124 are formed from separate strips of material.

Each frame joint 128 has a fixed position relative to the support frame 122, and each shell joint 130 has a fixed position relative to the deformable seat shell 116. Each motion control link has a corresponding frame joint 128 and shell joint 130 and allows the pair of joints to move with respect to each other while also constraining their relative movement. Here again, each motion control link is configured as a flat spring that undergoes elastic deformation when the corresponding frame and shell joints 128, 130 undergo relative movement. Each of the control links is a strip of material that bends in a direction parallel with the direction of the thickness of the strip of material when the corresponding joints 128, 130 undergo relative movement. The resulting movement of this configuration is somewhat different from that of the embodiment depicted in FIGS. 1-6 while maintaining at least some of the advantages depicted in FIGS. 7-9.

Figure 13:
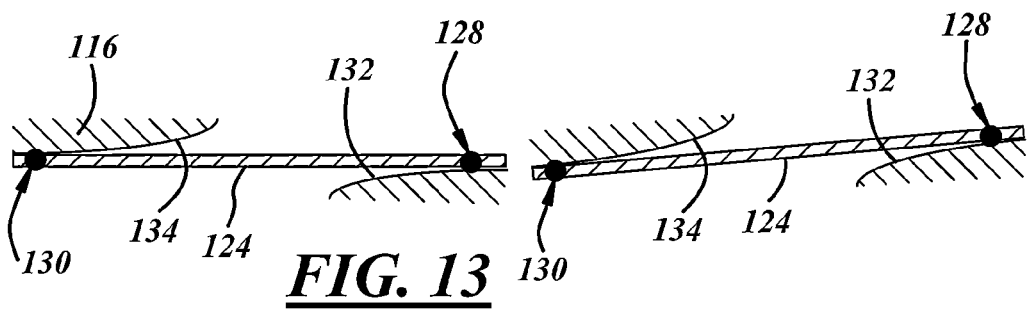
FIG. 13 a schematic side view of the outer motion control links of FIGS. 10-12 in an unloaded condition.
Figure 14:
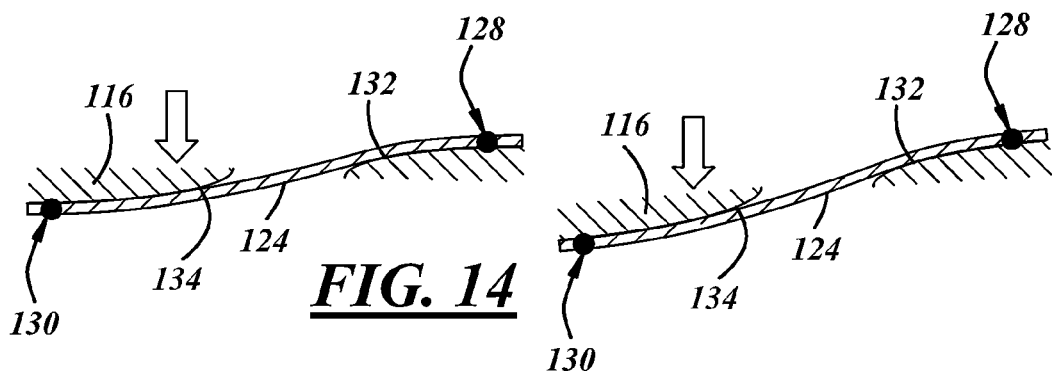
FIG. 14 is a schematic side view of the outer motion control links of FIG. 13 in a loaded condition.

FIGS. 13-16 are simplified schematic views illustrating the constrained relative motion associated with each of the motion control links 124, 126 depicted in FIGS. 10-12. FIG. 13 is a side view of one pair of the outer motion control links 124, each with a constrained frame joint 128 at one end and a constrained shell joint 130 at the opposite end. In this case, each of the outer motion control links 124 is formed from a separate piece of material so that the control links have separate frame joints 128 and shell joints 130. Each control link may be configured with a unique spring rate, shape, joint, etc. FIG. 13 shows the control links 124 in a relaxed or unloaded condition in which they are generally flat. FIG. 14 shows the control links 124 after corresponding frame and shell joints 128, 130 undergo relative movement, such as when a seat occupant sits on the seat. Each motion control link 124 bends along upward facing and downward facing cam surfaces 132, 134, as shown. One effect of the cam surfaces 132, 134 is to continually increase the stiffness of the control links 124 as the deformable shell 116 and, thereby, the shell joints 130 move in a downward direction and the frame joints 128 remain stationary. That is, the effective length of each of the bolster springs 124 is continually decreased as each spring bends along and comes into contact with a larger portion of the cam surfaces 132, 134. The shape of the cam surfaces 132, 134 can thus be tuned to exhibit the desired rate of increase in spring rate for each spring. As noted above, the ability of the deformable seat shell 116 to flex and change shape accommodates the illustrated movement.

Figure 15:
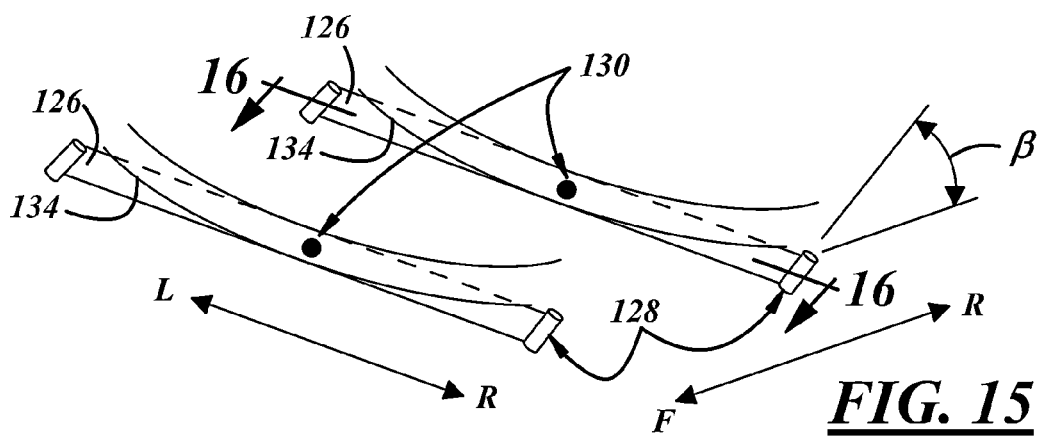
FIG. 15 is a schematic perspective view of the inner motion control links of FIGS. 10-12 in an unloaded condition.

FIG. 15 shows the inner motion control links 126, each with a pivot frame joint 128 at one end and a constrained shell joint 130 at the opposite end. Each individual or pair of motion control links 126 may be configured with a unique spring rate, shape, joints, etc. FIG. 15 shows the control links 126 in the relaxed or unloaded condition so that they are generally flat with the widthwise direction of each strip of material inclined with respect to horizontal, by about 45 degrees, for example. The pivot axes for the pivot joints 128 are inclined with respect to the horizontal by about the same angle, shown in FIG. 15 as an angle of inclination $\beta$.

Figure 16:
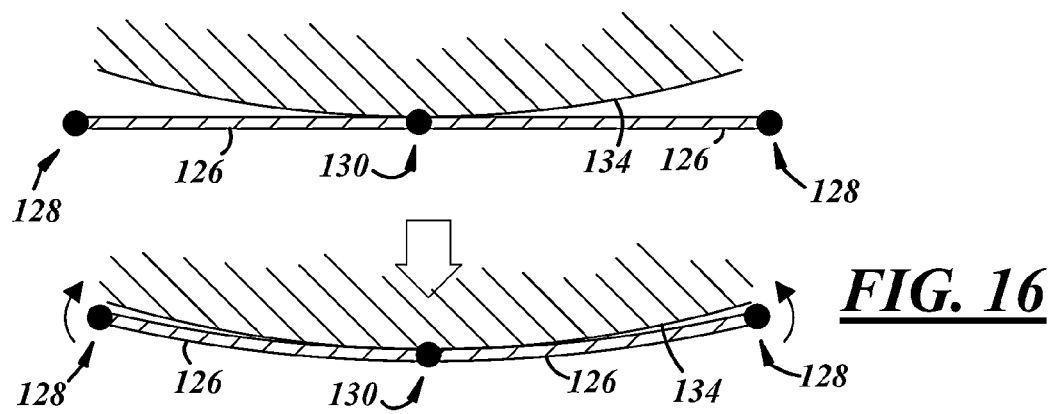
FIG. 16 is a schematic cross-sectional view of the inner motion control links of FIG. 15 in a loaded condition.

FIG. 16 is a cross-sectional view of one pair of the control links 126 of FIG. 16 taken perpendicular to the thickness of the control links. The top of FIG. 16 shows the unloaded condition, and the bottom of FIG. 16 shows a loaded condition after the frame and shell joints 128, 130 undergo relative movement, such as when a seat occupant sits on the seat. Each control link 126 bends along a corresponding downward facing cam surface 134, as shown. The deformable shell and, thereby, the shell joints 130 move in a downward and rearward direction, while the frame joints 128 remain stationary. As each control link 126 bends, it comes into contact with a larger portion of the corresponding cam surface 134. The shape of the cam surfaces 134 can be tuned to exhibit the desired rate of increase in spring rate for each link 126. The cam surfaces 134 and the angle of inclination $\beta$ of the width of the strip of material and/or the pivot axes of joints 128 can be configured to achieve the desired direction of movement of the deformable seat shell with respect to the support frame. The direction of movement in this example is generally perpendicular to the thickness direction of the control links 126 (parallel with the direction of bending). Stated differently, the direction of movement is generally at an angle of $\beta-90°$, where $0°>\beta>90°$. The angle of inclination $\beta$ may range anywhere is preferably between 15 and 75 degrees. In one embodiment, the angle β is between 30 and 60 degrees. In another embodiment, the angle β is about 45 degrees.

Thus, when a seat occupant first sits on the seat, the deformable seat shell may move in downward and/or rearward directions, with the reverse movement occurring when the occupant vacates the seat, similar to previously described embodiments. Here again, it is noteworthy that the movement of the outer motion control links 124 and the movement of the inner motion control links 126, though shown as independent movements in FIGS. 13-16, are not entirely independent due to all of the frame joints 128 being fixed in position relative to the support frame, and all of the shell joints 130 being fixed in position relative to the deformable seat shell. The flexibility of the deformable seat shell accommodates relative movement of the different shell joints with respect to one another, and the otherwise predictable, uniform vertical movement provided by the depicted bolster springs 124 if they were acting alone, may be affected by the constraints on seat shell movement due to the seating region springs 126.

With reference again to the exploded view of FIG. 12, some of the components of this particular embodiment of the seat pan 138 are further described. As shown, the seat pan 138 includes the deformable seat shell 116 and the shell motion controller 120, which may also be referred to as a compliant shell motion controller in some cases. The shell motion controller 120 is coupled to the deformable seat shell 116 and is configured to mate with foundation-support surfaces of the support frame (not shown). The illustrated shell motion controller 120 includes first and second outer shell mounts 142 and an inner shell mount 144. The inner shell mount 144 extends generally between the first and second outer shell mounts 142, but could be located between or extend to joints outside of the outer shell mounts 142.

In this embodiment, each outer shell mount 142 is coupled to opposite side portions 146 of the deformable seat shell 116 and arranged to lie in spaced-apart relation (e.g., left-to-right) with each other. The inner shell mount 144 is coupled to a central or occupant-support portion 148 of the deformable seat shell 116 between the first and second outer shell mounts 142. Each shell mount 142, 144 is configured to mate with the support frame to support the deformable seat shell 116 for shape-changing movement relative to the vehicle floor or other seat assembly support surface. The illustrated inner shell mount 144 controls movement of the deformable seat shell 116 when an occupant sits on the deformable seat shell so that the seat shell moves down and to the rear toward the seat back. The deformable seat shell 116 may be configured to move about 50% down and 50% to the rear, or along about a 45-degree angle.

The illustrated inner shell mount 144 includes left and right link foundations 150 and four inner motion control links 126. The left and right link foundations 150 are coupled to and arranged to lie in a stationary or fixed position on the support frame, and each has a portion that extends inwardly toward the other where the respective pivot frame joints are formed. One end of each of the motion control links 126 is pivotally coupled to one of the link foundations 150 to form the pivot frame joints, and an opposite end of each of the motion control links is coupled to the central portion 148 of the deformable seat shell 116 to form the constrained shell joints. In this particular example, the shell joints are formed via an inner shell support structure 166. The inner shell support structure 166 is coupled with front and rear pairs (i.e., strips) of motion control links 126 and provides the downward facing cam surfaces 134 for the inner shell mount. The width of each cam surface 134 is inclined with respect to the horizontal at about the same angle as each motion control link 126 to mate therewith. The illustrated inner shell support structure 166 extends between and interconnects front and rear pairs of motion control links 126. The inner shell support structure 166 may also provide some support and structure to the deformable seat shell 116.

In this example, the support structure 166 further includes stiffening portions 168, 170. Each stiffening portion 168, 170 is a wall or rib extending along the lengthwise edge of each cam surface 134 and generally perpendicular with each cam surface. In this example, one of the stiffening portions 168 extends away from the corresponding cam surface in one direction (i.e., upward and frontward), and the other of the stiffening portions 170 extends in the opposite direction (i.e., downward and rearward). These stiffening portions 168, 170 may be provided to limit or prevent flexing or bending of the cam surfaces 134 when under load so that the shape of the cam surfaces remains relatively constant, and they may be particularly useful where the support structure is formed from a relatively flexible material, such as a plastic material. The illustrated support structure 166 also includes spine members 172 that extend in the front-to-rear direction and interconnect each cam surface 134—and its associated stiffening portions 168, 170—with the other. The illustrated spine members 172 also act as stiffening members or beams that provide structure along the central portion 148 of the seat shell 116. In this embodiment, the support structure 166 is monolithic and separately formed from the seat shell. In other embodiments, the shell 116 and support structure 166 may be formed as a monolithic structure, or a portion of the support structure 166, such as the cam surfaces 134, stiffening portions 168, 170 and/or spine members 172, may be formed together with the seat shell 116 as a monolithic structure. Or one or more portions of the support structure 166 may be omitted entirely.

In the illustrated embodiment, the left and right link foundations 150 also provide joint forming portions for the outer shell mounts 142. In particular, each of the link foundations 150 includes a link anchor strip 156. In this example, one end of each outer motion control link 124 attaches to the bottom or underside of the link anchor strip 156 to form a constrained joint. Each anchor strip 156 includes a snubber portion 174 that overlies or covers a portion of each motion control link 124 to prevent the covered portion from deflecting in an upward direction. As with previous embodiments, each of the link foundations 150 may be formed from mating foundation plates 152. In the illustrated example, the plates 152 are arranged to attached to opposite left and right sides of a support frame for the seat assembly.

The upward facing cam surfaces 132 may be provided by the support frame or by some other component attached to the support frame of the seat. In this example, the upward facing cam surfaces 132 are provided by the link foundations 150. In this particular embodiment, cam surfaces 132 are relatively small in width in relation to the motion control links 124 and may be in the form of an edge surface as shown. The downward facing cam surfaces 134 of the outer shell mounts 142 are provided by outer shell support structures 175. These outer shell support structures 175 may be formed as separate pieces as shown, or they may be formed monolithically with the seat shell 116. In this example, each outer shell support structure 175 is affixed to and is fixed in position relative the deformable seat shell 116 so that the downward facing cam surfaces 134 and the associated constrained shell joints are fixed in position relative to the seat shell. The illustrated combination of components for the shell motion controller 120 can provide constrained relative motion of the deformable seat shell and the support frame with which it is coupled by the shell motion controller.

Figure 17:
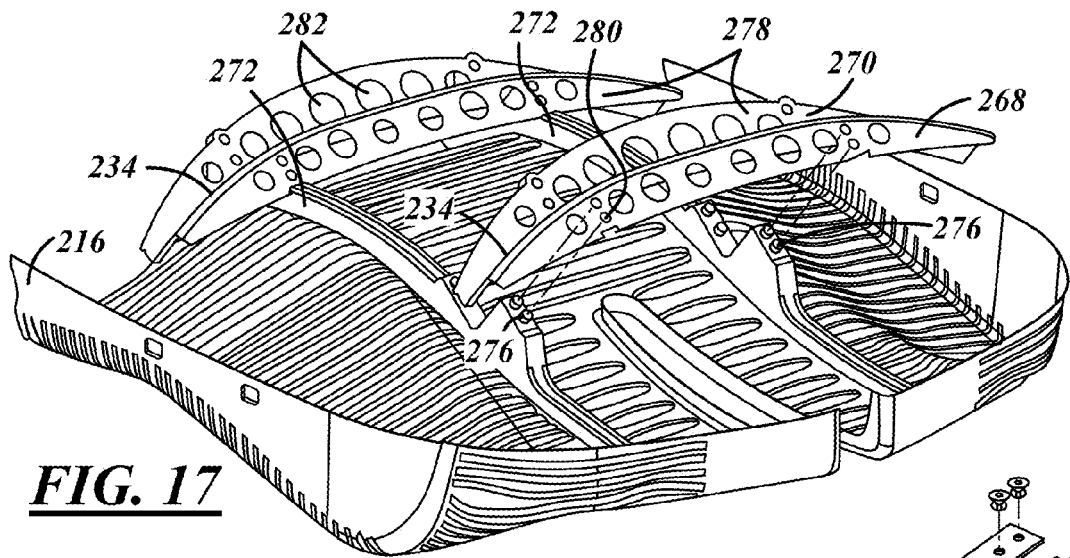
FIG. 17 is a front bottom perspective view of an embodiment of the deformable seat shell, illustrating the attachment of cross-spring cams.

FIGS. 17-21 illustrate some of the possible assembly steps for constructing a seat bottom 212 in accordance with another embodiment. This embodiment combines outer motion control links or bolster springs 224 similar to those depicted in FIGS. 1-6 with inner motion control links or cross-springs 226 similar to those depicted in FIGS. 10-16. FIG. 17 is a front bottom view of the deformable seat shell 216 showing portions of the shell motion controller being assembled thereto. In this example, spine members 272 are formed monolithically as part of the seat shell 216 and include attachment features (e.g., staking posts) 276 extending therefrom for attachment of cross-spring cams 278. Corresponding attachment features 280 of the cross-spring cams 278 are aligned with the shell features 276 for assembly. In this case, apertures 280 formed through the cross-spring cams 278 receive staking posts 276 of the seat shell 216, and the posts are flattened (e.g., by heat, pressure and/or ultrasonic staking) to attach the cams 278 to the seat shell. Other attachment feature pairings are possible (snap features, hole/fastener, etc.) and the attachment features may be omitted entirely in some cases.

Each of the cross-spring cams 278 includes a downward facing cam surface 234 (facing upward in FIG. 17 because the seat shell is inverted) and stiffening portions 268, 270. Each cross-spring cam 278 may be formed from a single piece of sheet metal or other suitable material. Where metal is employed, it may be possible to reduce the size or length of the stiffening portions when compared to plastic. The particular cams 278 shown in FIG. 17 include auxiliary openings 282, which may be included for weight-reduction, ease of manufacturing, or for other reasons. The cam surface(s) 234 may include a layer of sound-attenuating material, such as an elastomeric material (e.g., rubber) to help isolate the cam surface from the inner motion control links. This may be particularly useful where one or both of the cam surface 234 and the cross-spring are metal. An adhesive-backed layer of 1/16-inch rubber is suitable, but other materials may be used. For example, a thermoplastic elastomer (TPE) may be overmolded on the cam surface 234, or a spray-on coating may be employed.

Figure 18:
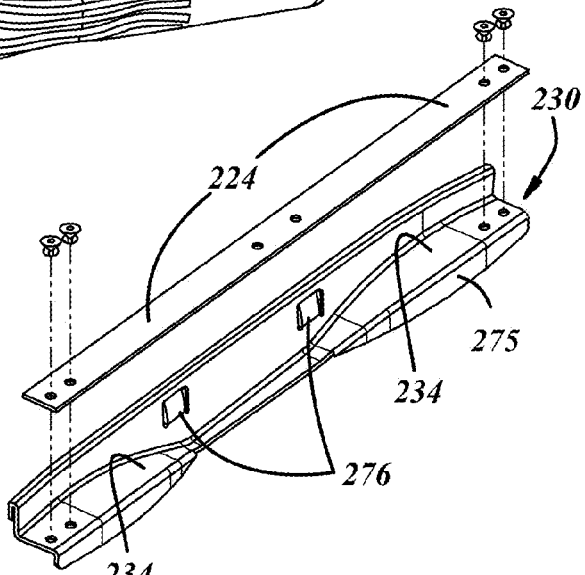
FIG. 18 is a bottom perspective view of an embodiment of an outer support structure, illustrating the attachment of bolster springs.

FIG. 18 illustrates the outer motion control links or bolster springs 224 arranged for attachment to the outer support structure or bolster edge frame 275. In this example, similar to the embodiment of FIGS. 1-6, two motion control links 224 are formed as a single strip of material. The single strip of material may be referred to as a side or bolster spring with independently deflectable opposite ends. Fasteners such as rivets, bolts, etc. are shown here forming constrained shell joints 230, with additional apertures provided near the center of the strip of material for formation of frame joints with a frame support or other structure. The support structure 275 includes downward facing cam surfaces 234 for each spring 224 and attachment features 276 (e.g., snap-in features) for attaching the structure 275 to the seat shell 216. In one embodiment, the support structure 275 is formed from sheet metal having a thickness of about 0.050 inches. Other materials such as plastic or plastic composite materials (e.g., glass-filled polyamide) may be used as well.

Figure 19:
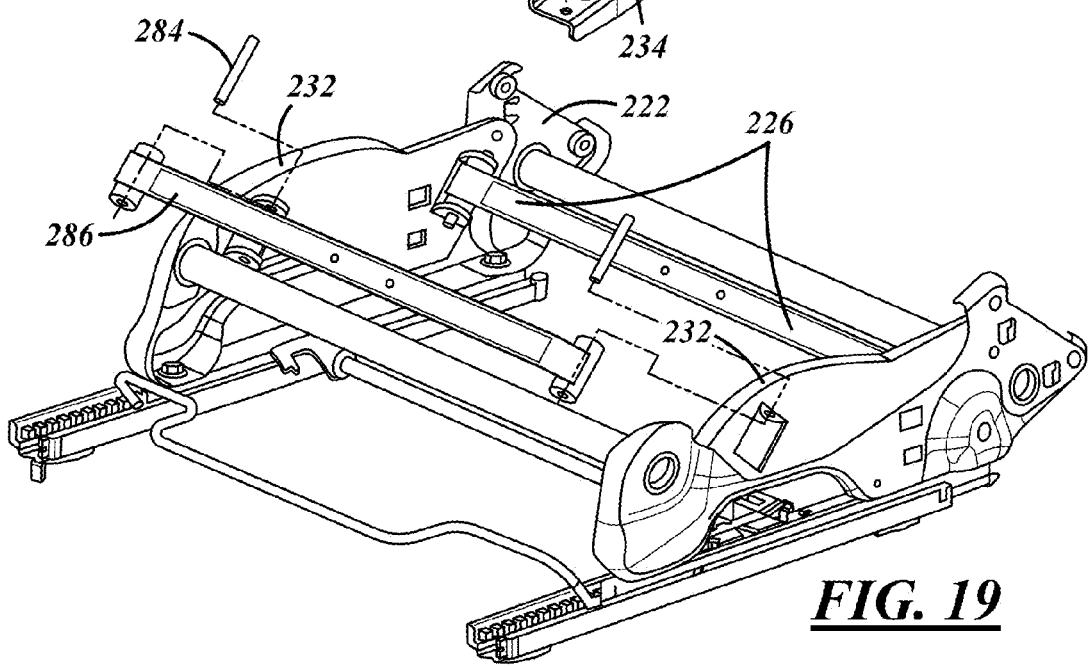
FIG. 19 is perspective view of a support frame, illustrating the attachment of cross-springs.

FIG. 19 illustrates the support frame 222, including upward facing cam surfaces 232 for the bolster springs. Here, the inner motion control links 226 are provided in pairs, with each pair being formed from a single strip of material that extends between opposite left and right sides of the support frame 222. Each pair of inner motion control links 226 may together be referred to as a cross-spring. Front and rear cross-springs are coupled with the support frame by pins 284 to form pivot frame joints at opposite ends of each cross-spring. In this example, a layer of sound-attenuating material 286 is provided with each cross-spring and oriented to face toward the cam surfaces of the cross-spring cams. As noted above, the layer 286 may alternatively or additionally be provided as an attachment to the cam surface itself. As shown, apertures may be provided near the center of each cross-spring for attachment to the cross-spring cams and formation of the constrained shell joints.

Figure 20:
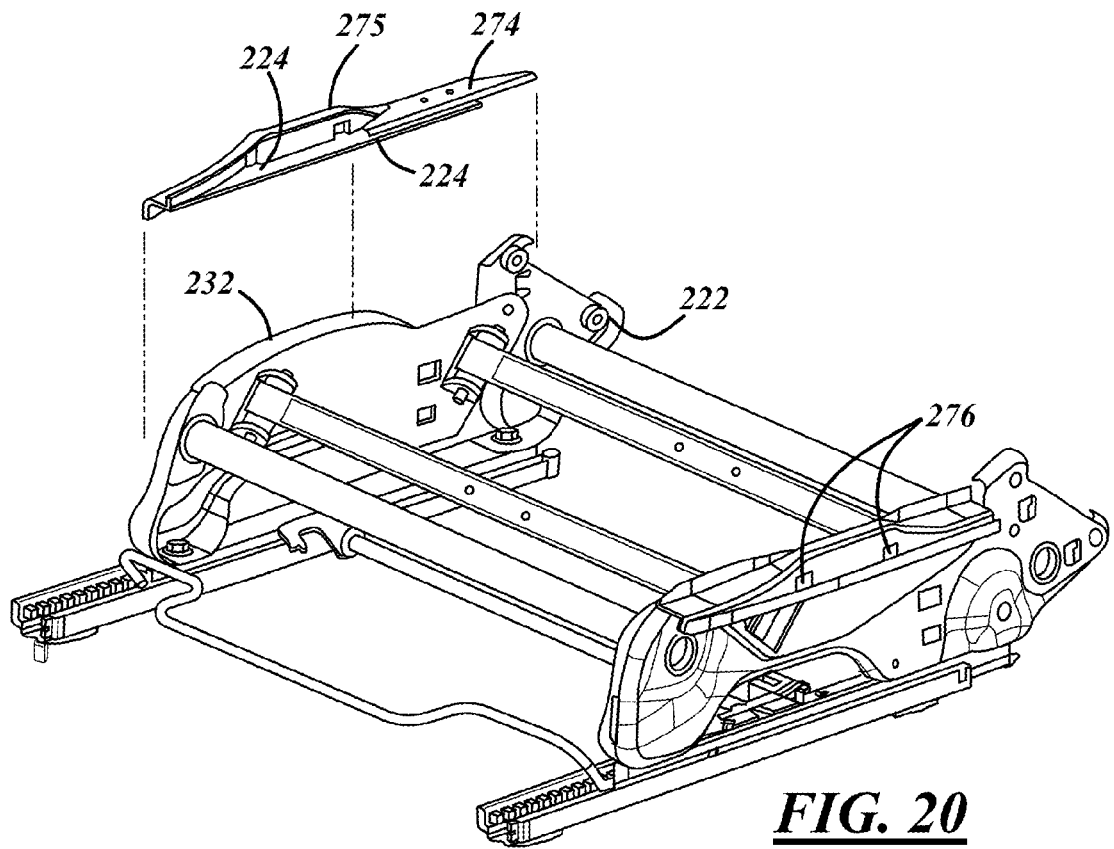
FIG. 20 is a perspective view of the support frame of FIG. 19, illustrating the attachment of bolster spring subassemblies.
Figure 21:
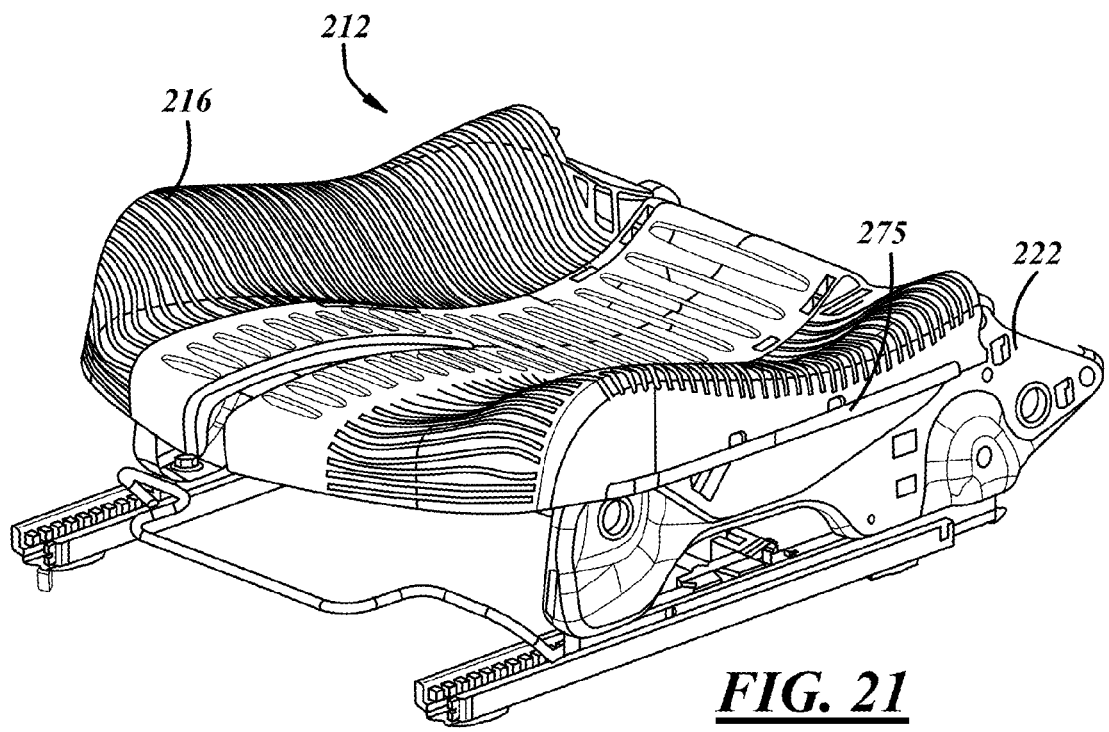
FIG. 21 is a perspective view of the subassembly of FIG. 17 attached to the subassembly of FIG. 20.
Figure 22:
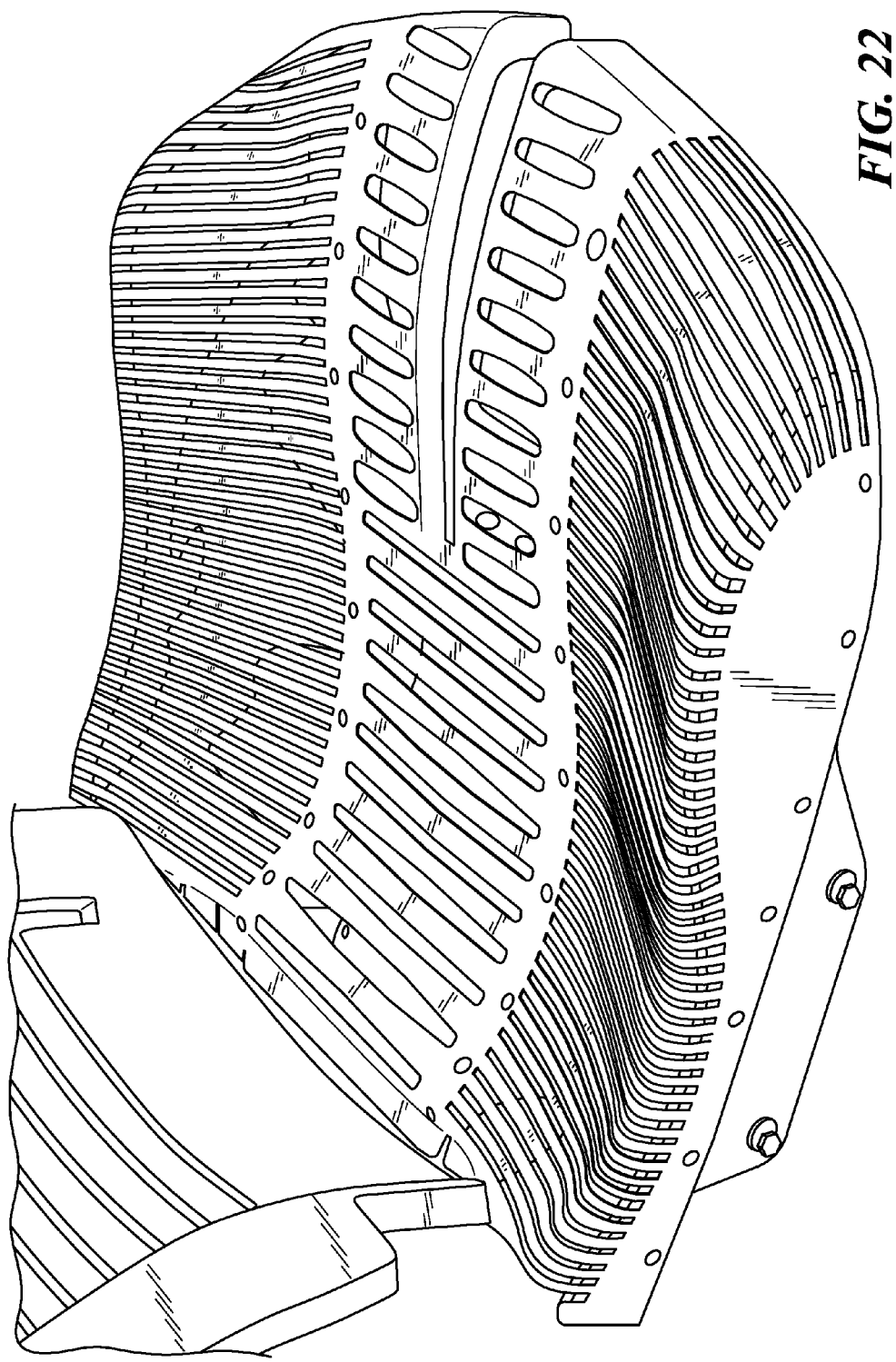
FIGS. 22-28 illustrate various examples of deformable seat shells suitable for use with the shell motion controller described herein.
Figure 23:
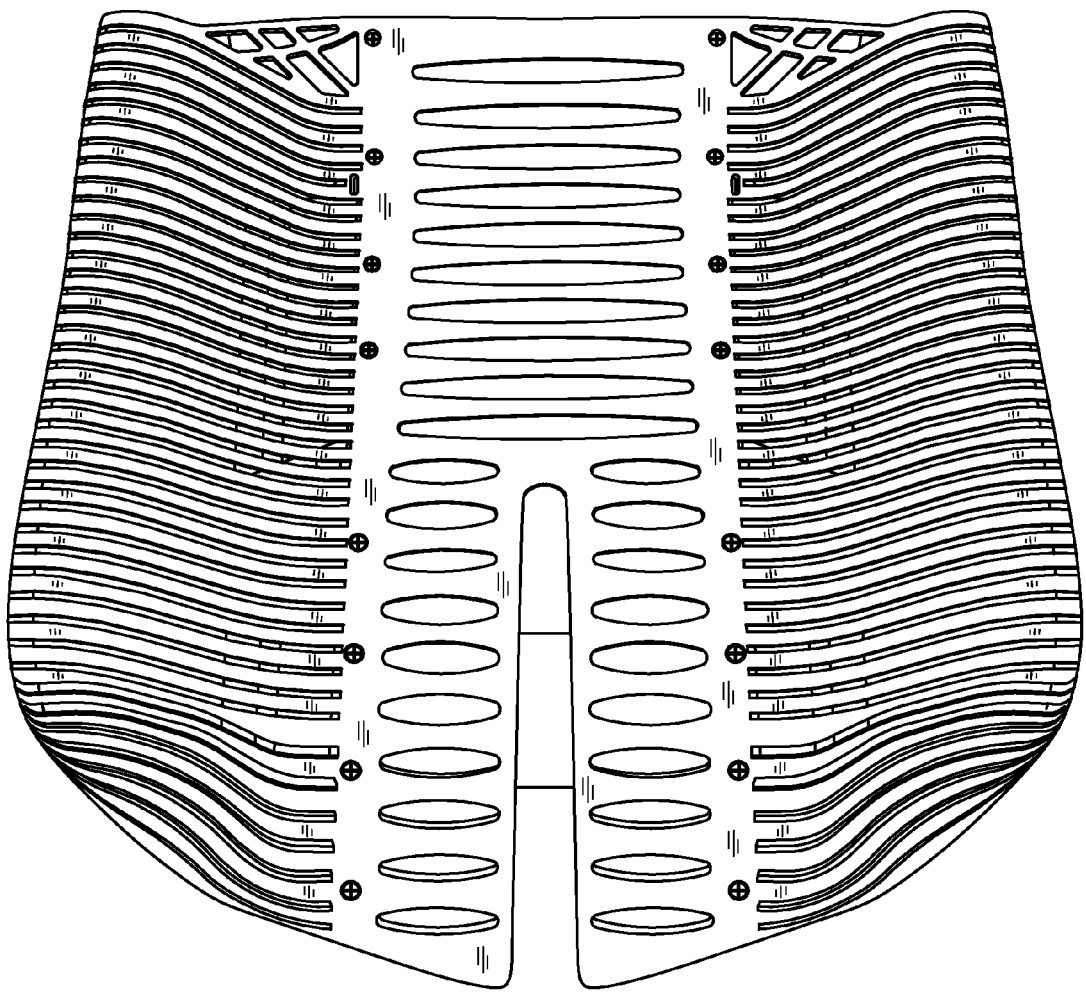
Figure 24:
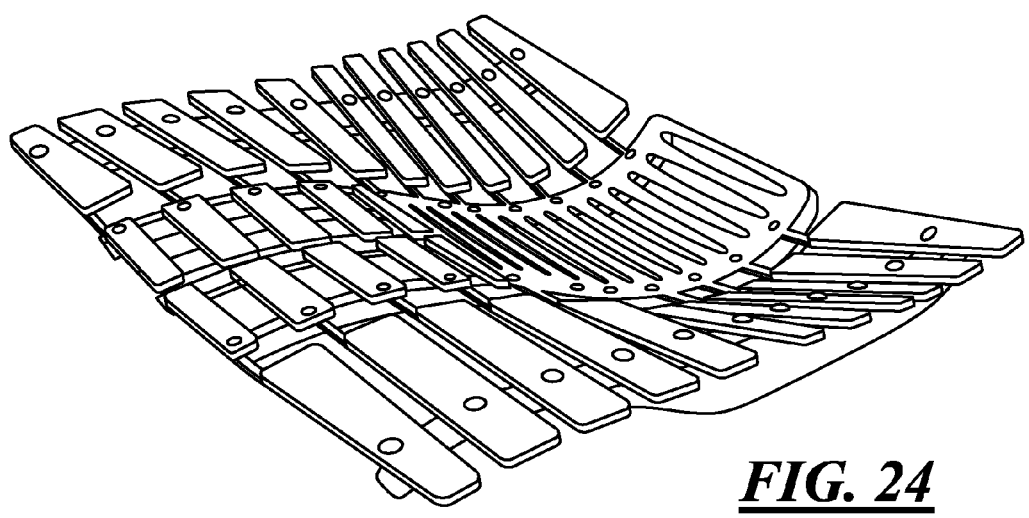
Figure 26:
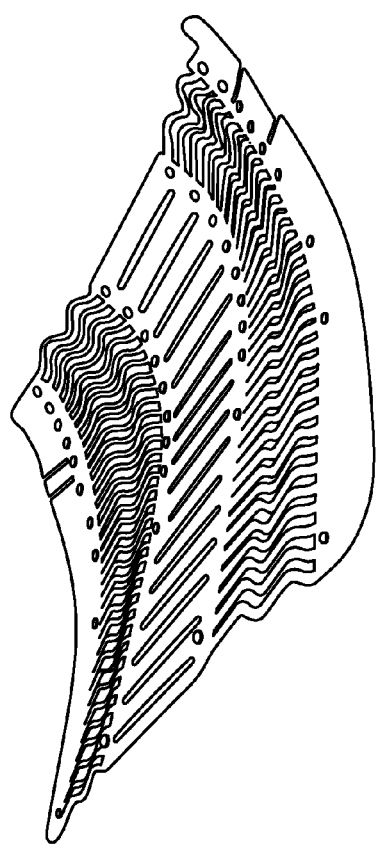
Figure 28:
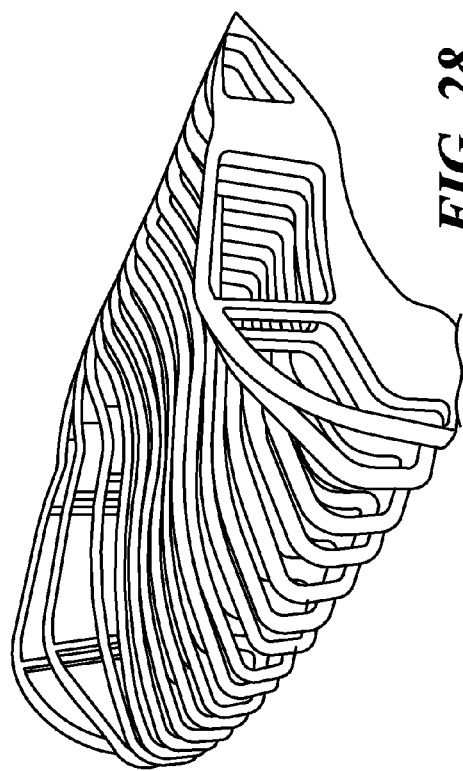
Figure 25:
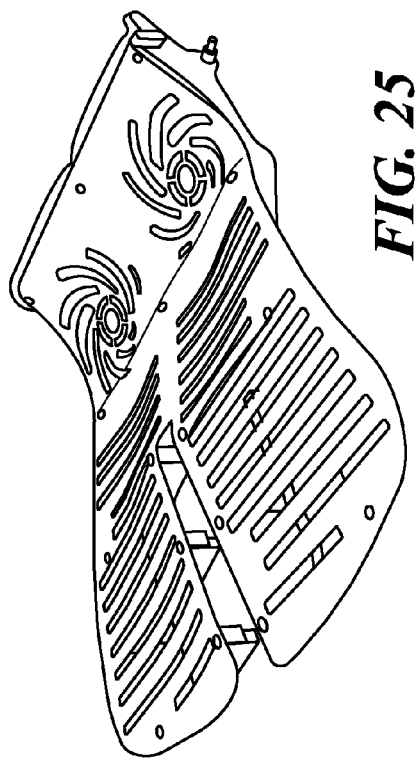
Figure 27:
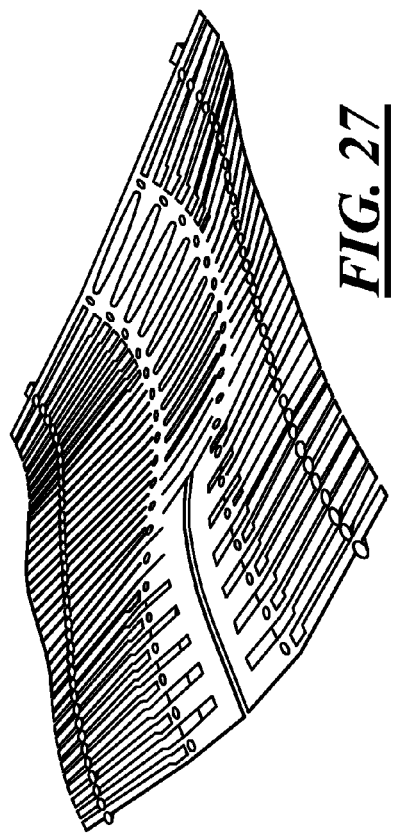

FIG. 20 shows the bolster springs 224, together with bolster snubbers 274, being attached to the upward facing cam surfaces 232 of the support frame 222. The snubbers 274 are provided to inhibit upward motion of the bolster springs to avoid a "rocking" feel to the bolster motion. For example, without snubbers 274, placing a downward load on the front portion of the bolster region of the seat bottom can cause a rearward portion of the bolster region to lift or raise. The snubbers 274 may be formed as a separate piece of sheet metal, as shown here, or may be integrated as a portion or extension of some other component. Once the bolster springs are in place, the subassembly of FIG. 17 can be placed over the cross-springs and outer shell supports 275 and attached thereto. The attachment features 276 of the outer shell supports 275 may snap into openings formed in the side walls of the deformable seat shell 216, and fasteners or other suitable attachment means may be used to attach the cross-spring cams 278 to the cross-springs. FIG. 21 shows the finished seat bottom 212 (without a decorative covering or frame covers or panels). The example of FIGS. 17-21 is illustrative only, as the seat components may be assembled in any order and may include additional components or omit certain components consistent with the teachings presented herein. For example, the outer support structures 275, bolster springs and/or cross-springs could be assembled to the deformable seat shell before being attached to the support frame.

In other variations, the above-described sound-attenuating layer 286 may be included along one or both opposite sides of the bolster springs and/or the cam surfaces associated therewith. In one embodiment, the upward and downward facing cam surfaces of the outer shell mount are metal, and a sound-attenuating layer is provided between the bolster spring and one or both of the cam surfaces. While each of the motion control links in the figures is in the form of a strip of material that acts as a flat spring that bends along a cam surface, other motion control links are possible and the cam surfaces are optional. For example, a motion control link may be in the form of a rigid rod or an assembly of rigid rods configured to link a given frame joint to a given shell joint and to allow constrained relative movement thereof. Such control links may be acted upon by a spring or other biasing member. Other types of springs may be used instead of or in addition to the illustrated flat springs, such as coil springs, torsional springs, leaf springs, belleville washers, etc.

Where springs are used as motion control links, metal strips may be preferred due to their resilience to relaxation over time when compared to non-metallic materials such as polymeric materials. In one example, the cross-springs are formed from spring steel having a thickness between 0.050 inches and 0.0625 inches, but thickness may vary depending on the desired movement characteristics, material choice, etc. The spring material may be heat-treated as well. Similar materials may be used for the bolster springs. In one embodiment, each cross-spring includes bushings or other bearing surfaces at its opposite ends for formation of pivot frame joints. For example, each end of the cross-springs may include a cylindrical portion that receives the pins 284 of FIG.

19 and provides an inner bearing surface that interfaces with the outer surface of each pin for pivoting movement. Such a cylindrical portion may be a low-friction plastic material (e.g., acetal, nylon, etc.) and may be overmolded or otherwise attached to the strip of material that makes up the flexible portion of the control link. The ends of each cross-spring could also be formed by bending the ends into the desirable shape.

In yet another variation, a dashpot or other type of motion-damping mechanism is operatively connected between the deformable seat shell and the support frame to affect the rate of elastic motion of the motion control links. For example, in the embodiment depicted in FIGS. 17-21, one end of the damping mechanism may be coupled with a cross-spring cam, and an opposite end of the damping mechanism may be coupled with the support frame, such as a cross-member extending between left and right sides of the support frame.

A seat assembly constructed in accordance with the teachings herein may have a comfort feel similar to or superior to that of traditional rigid seat pans topped with polyurethane or other foam materials. A seat bottom including the deformable seat shell described above, when coupled with the shell motion controller configured as taught herein, may reduce or eliminate the need for bulky and environmentally-challenging foam buns or cushions, while providing a lower-profile (small packaging) design and increasing occupant comfort by properly maintaining the occupant's pelvis and lumbar region near the seat back and preventing pelvis drift. In one embodiment, the deformable seat shell is constructed from a recyclable thermoplastic material.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A seat assembly, comprising:
a seat bottom having a deformable seat shell configured to change shape with a changing occupant load distribution;
a motion control link coupling the deformable seat shell with a support frame via a frame joint and a shell joint so that said joints can undergo relative movement, the frame joint being at a fixed position relative to the support frame and the shell joint being at a fixed position relative to the deformable seat shell, wherein the motion control link constrains said relative movement; and
a cam surface, wherein the motion control link elastically bends along the cam surface when said joints undergo relative movement, at least one of the joints being a constrained joint at the cam surface.

2. A seat assembly as defined in claim 1, wherein the motion control link is a spring, wherein the stiffness of the spring continually increases as the spring bends and comes into contact with a larger portion of the cam surface.

3. A seat assembly as defined in claim 1, wherein said cam surface is fixed with respect to the deformable seat shell.

4. A seat assembly as defined in claim 1, wherein said cam surface is fixed with respect to the support frame.

5. A seat assembly as defined in claim 1, further comprising a layer of sound-attenuating material located between the motion control link and the cam surface when the motion control link elastically bends along the cam surface.

6. A seat assembly as defined in claim 1, wherein the cam surface is a first cam surface located on one side of the motion control link and the seat assembly further comprises a second cam surface located on an opposite side of the motion control link, wherein the motion control link elastically bends along both cam surfaces when said joints undergo relative movement.

7. A seat assembly as defined in claim 1, wherein the other one of the joints is a constrained joint.

8. A seat assembly as defined in claim 1, wherein the motion control link is an elongate member extending along a front-to-rear direction with respect to the seat assembly.

9. A seat assembly as defined in claim 1, wherein the motion control link is an elongate member extending along a side-to-side direction with respect to the seat assembly.

10. A seat assembly as defined in claim 1, wherein the motion control link is a flat spring.

11. A seat assembly as defined in claim 10, wherein the direction of the width of the flat spring is inclined with respect to horizontal.

12. A seat assembly as defined in claim 1, further comprising a second motion control link coupling the deformable seat shell with the support frame via a second frame joint and a second shell joint so that said second joints can undergo relative movement, the second frame joint being at a fixed position relative to the support frame and the second shell joint being at a fixed position relative to the deformable seat shell, wherein the second motion control link constrains said relative movement of said second joints.

13. A seat assembly as defined in claim 12, wherein the motion control links include at least one bolster spring that bends along the cam surface in one direction and along another cam surface in another opposite direction when the deformable seat shell and the support frame undergo relative movement.

14. A seat assembly as defined in claim 12, wherein the cam surface is an inclined cam surface and the motion control links include at least one cross-spring that bends along the inclined cam surface so that the deformable seat shell moves in downward and rearward directions relative to the support frame when an occupant sits on the seat assembly.

15. A seat assembly as defined in claim 1, wherein the deformable seat shell includes left and right leg support sections separated by a centrally located slot that allows said support sections to simultaneously deform by different amounts from each other.

16. A seat assembly as defined in claim 1, wherein the deformable seat shell is made from a semi-rigid plastic material and includes a plurality of slots formed through the plastic material that provide the deformable plastic shell with shape-changing flexibility so that the deformable shell can change shape in response to the changing occupant load distribution, the shell joint being formed along the semi-rigid plastic material.

17. A seat assembly as defined in claim 1, wherein the motion control link is one of a pair of outer motion control links, the seat assembly further comprising a pair of inner motion control links, each one of the control links being coupled with the deformable seat shell at a respective shell joint and with the support frame at a respective frame joint, wherein the shell and frame joints of the outer motion control links are located at left and right bolster regions of the seat bottom and the shell joints of the inner motion control links are located at a seating region between said bolster regions.

18. A seat assembly as defined in claim 17, wherein each one of the shell joints and the frame joints of the outer motion control links is a constrained joint.

19. A seat assembly as defined in claim 17, wherein each one of the shell joints of the inner motion control links is a constrained joint and each one of the frame joints of the inner motion control links is a pivot joint.

20. A seat assembly as defined in claim 17, wherein each one of the shell joints of the inner motion control links is a pivot joint and each one of the frame joints of the inner motion control links is a constrained joint.

\* \* \* \* \*